(12) United States Patent
Nishimura et al.

(10) Patent No.: US 12,057,085 B2
(45) Date of Patent: Aug. 6, 2024

(54) SCANNING SIGNAL LINE DRIVE CIRCUIT AND DISPLAY DEVICE PROVIDED WITH SAME

(71) Applicant: Sharp Display Technology Corporation, Kameyama (JP)

(72) Inventors: Jun Nishimura, Kameyama (JP); Kengo Hara, Kameyama (JP); Yohei Takeuchi, Kameyama (JP); Yoshihito Hara, Kameyama (JP); Tohru Daitoh, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/233,359

(22) Filed: Aug. 14, 2023

(65) Prior Publication Data
US 2024/0112646 A1 Apr. 4, 2024

(30) Foreign Application Priority Data
Sep. 30, 2022 (JP) .................. 2022-157445

(51) Int. Cl.
G09G 3/36 (2006.01)
G06F 3/041 (2006.01)
G09G 3/20 (2006.01)

(52) U.S. Cl.
CPC ....... *G09G 3/3677* (2013.01); *G06F 3/04166* (2019.05); *G09G 3/2096* (2013.01); *G09G 2310/0286* (2013.01); *G09G 2330/021* (2013.01)

(58) Field of Classification Search
CPC ..... G09G 2310/0286; G09G 2320/043; G09G 2320/045; G09G 3/2096; G09G 3/367; G09G 2330/021; G06F 3/04166–041662; G11C 17/02; G11C 19/28–287
See application file for complete search history.

(56) References Cited

U.S. PATENT DOCUMENTS

| | | | |
|---|---|---|---|
| 2017/0108989 A1* | 4/2017 | Gu | G06F 3/0412 |
| 2019/0096353 A1 | 3/2019 | Tanaka et al. | |
| 2020/0168162 A1* | 5/2020 | Feng | G09G 3/3266 |
| 2020/0168284 A1* | 5/2020 | Yu | G06F 3/0412 |

OTHER PUBLICATIONS

In June Kim et al."Integrated Gate Driver Circuit Technology with IGZO TFT for Sensing Operation", SID Digest, pp. 196-198 (2019), First published: Apr. 11, 2019.

\* cited by examiner

*Primary Examiner* — Amr A Awad
*Assistant Examiner* — Aaron Midkiff
(74) *Attorney, Agent, or Firm* — ScienBiziP, P.C.

(57) ABSTRACT

A set circuit in a unit circuit in a gate driver of a display device includes a setting transistor, a first auxiliary transistor, and a second auxiliary transistor. The setting transistor includes a source terminal connected to an internal node, a gate terminal connected to a set input terminal, and a drain terminal connected to the set input terminal via the first auxiliary transistor and also connected to an input terminal via the second auxiliary transistor in a diode-connected form. Each transistor is controlled to be in an on state and an off state during normal drive and is controlled to be in the off state and the on state during a pause period by a control signal supplied to the input terminal.

10 Claims, 12 Drawing Sheets

ONE-SIDE INPUT AND ONE-SIDE ARRANGEMENT SYSTEM

BOTH-SIDE INPUT AND BOTH-SIDE ARRANGEMENT SYSTEM

ONE-SIDE INPUT AND BOTH-SIDE ARRANGEMENT SYSTEM

| OPERATION PERIOD | VDD-CONNECTED CONFIGURATION | DIODE-CONNECTED CONFIGURATION | FIRST EMBODIMENT |
|---|---|---|---|
| [OPERATION PERIOD 1] NORMAL DRIVE, NON-SELECT TIME (STEADY STATE OF MAJORITY OF STAGES) | 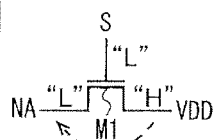 | 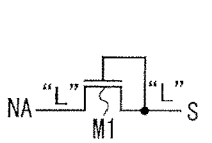 | 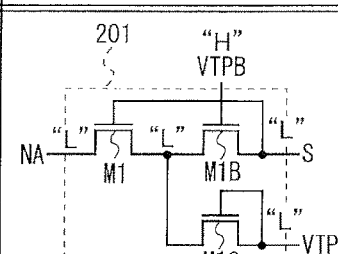 |
| [OPERATION PERIOD 2] NORMAL DRIVE, SELECT TIME (FROM COMPLETION OF SET TO RESET) | 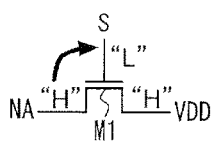 | 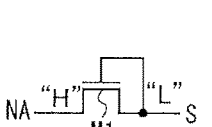 | 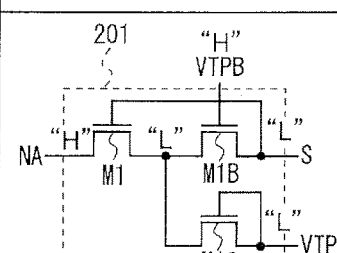 |
| [OPERATION PERIOD 3] DURING SUSPENSION, NON-SELECTION STAGE (MAJORITY OF STAGES) | 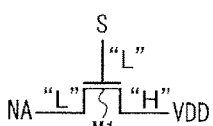 | 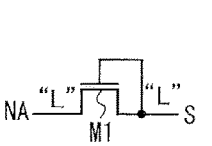 | 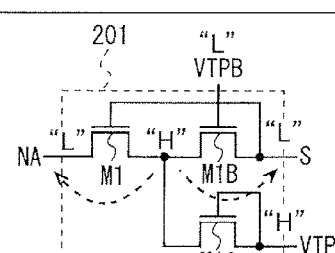 |
| [OPERATION PERIOD 4] DURING SUSPENSION, SELECTION STAGE (SEVERAL STAGES PER ONE SUSPENSION) | 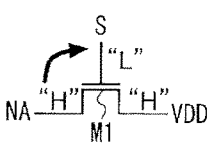 | 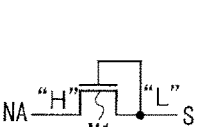 | 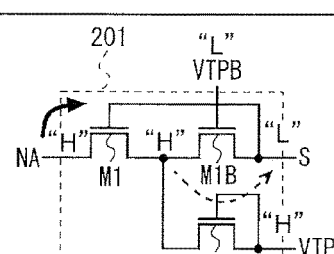 |

SCANNING SIGNAL LINE DRIVE CIRCUIT AND DISPLAY DEVICE PROVIDED WITH SAME

CROSS-REFERENCE TO RELATED APPLICATIONS

This application claims the benefit of priority to Japanese Patent Application Number 2022-157445 filed on Sep. 30, 2022. The entire contents of the above-identified application are hereby incorporated by reference.

BACKGROUND

Technical Field

The following disclosure relates to a display device, and more specifically relates to a scanning signal line drive circuit for driving scanning signal lines arranged in a display portion of the display device, and particularly relates to a scanning signal line drive circuit provided to the display device provided with a touch panel.

Typically, an active matrix display device has been known in which the active matrix display device is provided with a display portion including a plurality of data signal lines (also referred to as "data lines"), a plurality of scanning signal lines (also referred to as "gate lines") intersecting the plurality of data signal lines, and a plurality of pixel forming sections arranged in a matrix shape along the plurality of data signal lines and the plurality of scanning signal lines. Such an active matrix display device includes a data signal line drive circuit (also referred to as a "data driver" or a "source driver") for driving the plurality of data signal lines and a scanning signal line drive circuit (also referred to as a "gate driver") for driving the plurality of scanning signal lines. The scanning signal line drive circuit applies each of a plurality of scanning signals to a corresponding one of the plurality of scanning signal lines so that each of the plurality of scanning signal lines is sequentially selected in each frame period, and the data signal line drive circuit applies each of a plurality of data signals representing an image signal to be displayed to a corresponding one of the plurality of data signal lines in association with such a sequential selection of the plurality of scanning signal lines. Accordingly, each of a plurality of pieces of pixel data constituting image data representing an image to be displayed is provided to a corresponding one of the plurality of pixel forming sections.

Incidentally, in an active matrix display device, typically, the scanning signal line drive circuit has been mounted as an integrated circuit (IC) chip on a peripheral portion of a substrate constituting a display panel including the display portion described above in many cases. However, in recent years, more display devices have a configuration in which the scanning signal line drive circuit is formed directly on a substrate. Such a scanning signal line drive circuit is referred to as a "monolithic gate driver", "GDM circuit" or the like, and a display panel including such a scanning signal line drive circuit is referred to as a "gate driver monolithic panel" or a "GDM panel". In the GDM panel, the scanning signal is input from the gate driver serving as the scanning signal line drive circuit formed in a frame region of the GDM panel toward a display portion serving as a display region. According to such a GDM panel, by using a thin film transistor (hereinafter abbreviated as "TFT") including a channel layer formed of, for example, an oxide semiconductor such as Indium Gallium Zinc Oxide (IGZO) or the like, the gate driver can be formed on glass in a small area and frame narrowing can be achieved.

Meanwhile, in recent years, a touch panel for detecting a touch position by a finger, a pen, and/or the like has been mounted on the active matrix display device in many cases. As the touch panel mounted on such an active matrix display device, in recent years, an in-cell touch panel using a common electrode as an electrode for touch position detection has been actively developed. In the active matrix display device provided with such an in-cell touch panel, the common electrode in the display panel is used as the electrode for the touch position detection, and thus touch position detection processing needs to be performed at a time when a scan of gate lines is not performed. Thus, in order to ensure sufficient response performance, it is necessary to provide a plurality of pause periods for the touch position detection by performing a suspension of the scan in one frame period (one vertical scanning period). That is, it is necessary to repeat the suspension and resumption of the scan a plurality of times during the one frame period. Note that here, a sequential selection of each gate line starting with the first gate line and ending with the final gate line is simply referred to as a "scan", and a suspension of the scan after the first line and before the final line is referred to as a "scan suspension". Further, a period during which the scan is suspended is referred to as a "pause period".

PATENT LITERATURE

PTL 1: US 2019/0096353 A

Non-Patent Literature

NPL 1: In June Kim, Seok Noh, Myung Ho Ban, Ki Min Son, In Hyo Han, Hun Ki Shin, Kil Hwan Oh, Bum Sik Kim, "Integrated Gate Driver Circuit Technology with IGZO TFT for Sensing Operation", SID Digest, pp. 196-198 (2019)

SUMMARY

The above-described monolithic gate driver (GDM circuit) may be formed on a substrate constituting a display panel by using a thin film transistor (hereinafter abbreviated as "TFT") including a channel layer made of an oxide semiconductor such as IGZO. In such a GDM circuit, a voltage in a direction to turn off some of the thin film transistors may be applied as a negative voltage stress to the gate terminals of the some of the thin film transistors for a long time, and threshold values of the transistors may shift. When a threshold shift progresses in this manner, the thin film transistor may operate as a depletion type although the thin film transistor is originally to operate as an enhancement type (hereinafter, this phenomenon is referred to as "depletion"). When the thin film transistor is in the depletion in this manner, a through current always flows in many stages of a shift register constituting the GDM circuit, and power consumption is remarkably increased.

On the other hand, it is conceivable to suppress the threshold shift of the transistor by configuring the transistor in which the above-described threshold shift may occur in the GDM circuit to be in a diode-connected form. However, in a case where such a GDM circuit is used in an active matrix display device provided with an in-cell touch panel, with the transistor in the diode-connected form, a leakage current is generated when the transistor is in an off state, and thus a pause period having a sufficient length for the touch position detection cannot be provided.

Thus, in the active matrix display device provided with the in-cell touch panel, it is necessary to provide the pause period having the sufficient length for the touch position detection by the scan suspension while avoiding the depletion of the transistor in the GDM circuit.

(1) A scanning signal line drive circuit according to some embodiments of the present disclosure is a scanning signal line drive circuit configured to drive a plurality of scanning signal lines arranged in a display portion of a display device provided with a touch panel, the scanning signal line drive circuit including:

a plurality of unit circuits cascade-connected to each other and configured to operate as a shift register based on a multi-phase clock signal, wherein the multi-phase clock signal includes a plurality of clock signals, each of the plurality of clock signals cyclically corresponding to a respective one of the plurality of unit circuits, a clock operation of the plurality of clock signals stops during a pause period provided in a frame period, the pause period being used to detect a touch position on the touch panel, each of the plurality of unit circuits corresponds to a respective one of the plurality of scanning signal lines, each unit circuit of the plurality of unit circuits is a bistable circuit configured to determine a state of the unit circuit, based on a set signal and a reset signal each supplied as an input signal, and includes an internal node configured to selectively hold a voltage of a first or second logic level indicating a state of the unit circuit, a set input terminal configured to receive the set signal, a set circuit configured to supply the voltage of the first logic level to the internal node when the set signal is active, and an output circuit configured to output a scanning signal configured to cause a corresponding one of the plurality of scanning signal lines to be in a select state in response to a corresponding clock signal when the voltage of the first logic level is held in the internal node, and output a scanning signal configured to cause the corresponding one of the plurality of scanning signal lines to be in a non-select state in response to the corresponding clock signal when the voltage of the second logic level is held in the internal node, and the set circuit includes a setting transistor including a drain terminal, a source terminal connected to the internal node, and a gate terminal connected to the set input terminal, and is configured such that the voltage of the first logic level is supplied to the drain terminal of the setting transistor during the pause period, and the drain terminal of the setting transistor is connected to the gate terminal of the setting transistor during a period other than the pause period.

(2) The scanning signal line drive circuit according to some embodiments of the present disclosure includes the configuration of (1), wherein each of the plurality of unit circuits further includes a first control input terminal configured to receive a suspension state signal being active during the pause period and non-active during a period other than the pause period, and a second control input terminal configured to receive a drive state signal being active during a normal drive period and being non-active during a period other than the normal drive period, the normal drive period being a period in which the plurality of scanning signals are driven other than the pause period, and the set circuit further includes a first auxiliary transistor including a drain terminal connected to the set input terminal, a source terminal connected to the drain terminal of the setting transistor, and a gate terminal connected to the second control input terminal, and a second auxiliary transistor including a drain terminal connected to the first control input terminal, a source terminal connected to the drain terminal of the setting transistor, and a gate terminal connected to the first control input terminal.

(3) The scanning signal line drive circuit according to some embodiments of the present disclosure includes the configuration of (2), wherein each of the plurality of unit circuits further includes a reset input terminal configured to receive the reset signal, and a reset circuit configured to supply the voltage of the second logic level to the internal node when the reset signal is active, the reset circuit includes a resetting transistor including a drain terminal connected to the internal node, a source terminal connected to the first control input terminal, and a gate terminal connected to the reset input terminal, and the suspension state signal is a signal having the voltage of the first logic level when being active and having the voltage of the second logic level when being non-active.

(4) The scanning signal line drive circuit according to some embodiments of the present disclosure includes the configuration of (3), wherein each of the plurality of unit circuits further includes a stabilizing circuit including a stabilizing node that is a node different from the internal node and selectively holds the voltage of the first or second logic level, and the stabilizing circuit includes a first transistor configured to supply the voltage of the first logic level to the stabilizing node when the voltage of the second logic level is held in the internal node, a second transistor configured to supply the voltage of the second logic level to the stabilizing node when the voltage of the first logic level is held in the internal node, and a third transistor configured to supply the voltage of the second logic level to the internal node when the voltage of the first logic level is held in the stabilizing node.

(5) The scanning signal line drive circuit according to some embodiments of the present disclosure includes the configuration of (4), wherein the first transistor includes a drain terminal connected to the second control input terminal, a source terminal connected to the stabilizing node, and a gate terminal supplied with a power supply voltage corresponding to an on-voltage of the first transistor, the second transistor includes a drain terminal connected to the stabilizing node, a source terminal supplied with a reference voltage corresponding to the voltage of the second logic level, and a gate terminal connected to the internal node the third transistor includes a drain terminal connected to the internal node, a source terminal connected to the first control input terminal, and a gate terminal connected to the stabilizing node, and the drive state signal is a signal having the voltage of the first logic level when being active and having the voltage of the second logic level when being non-active.

(6) The scanning signal line drive circuit according to some embodiments of the present disclosure includes the configuration of (4), wherein each of the plurality of clock signals is a signal configured to alternately repeat a level corresponding to an active state and a level corresponding to a non-active state during a clock operation, and the first transistor includes a drain terminal connected to the second control input terminal, a source terminal connected to the stabilizing node, and a gate terminal supplied with any one of the plurality of clock signals.

(7) The scanning signal line drive circuit according to some embodiments of the present disclosure includes any one of the configurations of (4) to (6), wherein the stabilizing circuit further includes a fourth transistor configured to supply the voltage of the second logic level to the stabilizing node when the set signal is active.

(8) The scanning signal line drive circuit according to some embodiments of the present disclosure includes any one of the configurations of (1) to (7), and the transistor included in each of the plurality of unit circuits is a thin film transistor including a channel layer formed of an oxide semiconductor.

(9) A display device according to some embodiments of the present disclosure includes the scanning signal line drive circuit including any one of the configurations of (1) to (8).

(10) The display device according to some embodiments of the present disclosure includes the configuration of (9), wherein the scanning signal line drive circuit and the display portion are integrally formed on an identical substrate.

In some embodiments of the present disclosure, in the scanning signal line drive circuit for driving the plurality of scanning signal lines arranged in the display portion of the display device provided with the touch panel, the shift register that operates based on a multi-phase clock signal includes the plurality of unit circuits cascade-connected to each other, and the clock operation of the plurality of clock signals stops during the pause period of the scan provided in the frame period, the pause period being used for detecting the touch position on the touch panel. Each unit circuit is the bistable circuit that determines a state of the unit circuit based on the set signal and the reset signal each supplied as the input signal, and includes the internal node for selectively holding the voltage of the first or second logic level indicating the state of the unit circuit, the set input terminal for receiving the set signal, and the set circuit for supplying the voltage of the first logic level to the internal node when the set signal supplied to the set input terminal is active. The set circuit includes the setting transistor including the source terminal connected to the internal node and the gate terminal connected to the set input terminal, and is configured such that the voltage of the first logic level is supplied to the drain terminal of the setting transistor during the pause period, and the drain terminal of the setting transistor is connected to the gate terminal of the setting transistor during a period other than the pause period to cause the setting transistor to be in the diode-connected form. According to such a configuration, during normal drive, the setting transistor is in the diode-connected configuration and thus does not turn a negative voltage bias state. Thus, the setting transistor is not in the depletion due to the threshold shift. On the other hand, during the pause period of the scan for the touch position detection, the setting transistor is not in the diode-connected configuration but in the configuration in which the voltage of the first logic level is supplied to the drain terminal of the setting transistor, and thus almost no leakage current is generated in the setting transistor in the off state. Thus, the pause period having a sufficient length for the touch position detection can be provided. Note that, during the pause period, the setting transistor is in the negative voltage bias state, and thus may be in the depletion due to the threshold shift. However, the unit circuit including the setting transistor turning the negative voltage bias state is only a small part of all the unit circuits, and thus even if the depletion occurs, the increase in current consumption does not become a problem.

Thus, according to some of the above-described embodiments, in the display device provided with the touch panel, the pause period having the sufficient length for the touch position detection can be provided by the scan suspension while suppressing the increase in the current consumption due to the depletion of the setting transistor in each unit circuit.

Note that, in some embodiments described above, a thin film transistor (oxide TFT) including a channel layer formed of an oxide semiconductor is preferably used as the transistor included in each unit circuit (see the configuration of (8) described above). The oxide TFT has a small leakage current in the off state, and thus the oxide TFT is effective in providing the pause period of the scan having the sufficient length for the touch position detection. Meanwhile, as described above, during the normal drive, the setting transistor is in a configuration (a configuration corresponding to a VDD-connected configuration to be described later) in which the voltage of the first logic level is supplied to the drain terminal, instead of the diode-connected form, and thus, the increase in the power consumption due to the depletion of the oxide TFT as the setting transistor can be suppressed.

BRIEF DESCRIPTION OF DRAWINGS

The disclosure will be described with reference to the accompanying drawings, wherein like numbers reference like elements.

FIG. 11 is a diagram for describing actions and effects of the first embodiment in comparison with the first and second comparative examples.

DESCRIPTION OF EMBODIMENTS

Embodiments will be described below with reference to the accompanying drawings. Note that, in each transistor to be referred to below, a gate terminal corresponds to a control terminal, one of a drain terminal and a source terminal corresponds to a first conduction terminal, and the other of the drain terminal and the source terminal corresponds to a second conduction terminal. All the transistors in the present embodiments are N-channel type transistors, but the disclosure is not limited thereto. Note that, in the N-channel type transistor, among the two conduction terminals, one having higher potential is a drain terminal and one having lower potential is a source terminal, but in the present description, even in a case where high and low of potentials of the two conduction terminals are inverted during operations, one of the two conduction terminals is fixedly referred to as the "drain terminal" and the other is fixedly referred to as the "source terminal". Furthermore, "connection" in the present description means "electrical connection" unless otherwise specified, and in the scope without departing from the subject matters of the disclosure, it includes not only a case to mean direct connection, but also a case to mean indirect connection through other elements.

1. First Embodiment 1.1 Overall Configuration and Operation Outline

Figure 1:
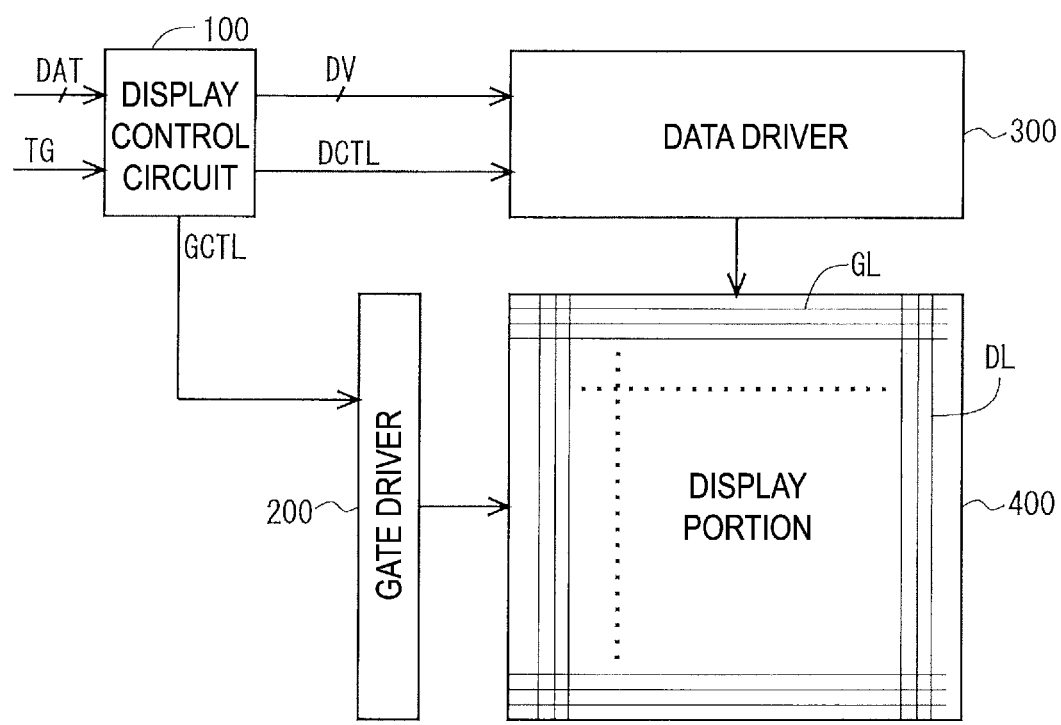
FIG. 1 is a block diagram illustrating an overall configuration of a display device according to a first embodiment.

FIG. 1 is a block diagram illustrating an overall configuration of a display device according to a first embodiment. This display device is an active matrix liquid crystal display device, and includes a display control circuit 100, a gate driver 200 serving as a scanning signal line drive circuit, a data driver 300 serving as a data signal line drive circuit, and a display portion 400 constituting a liquid crystal panel, as illustrated in FIG. 1. In the present embodiment, the gate driver 200 and the display portion 400 are formed on an identical substrate (on an active matrix substrate that is one of two substrates included in a liquid crystal panel). In other words, the gate driver 200 is a monolithic gate driver (GDM circuit). The liquid crystal panel functioning as the display portion 400 is integrated with the touch panel. In other words, the display device according to the present embodiment is a liquid crystal display device provided with the in-cell touch panel. A known or well-known configuration can be employed as the configuration of the touch panel.

As illustrated in FIG. 1, in the display portion 400, a plurality of data lines (data signal lines) DL and a plurality of gate lines (scanning signal lines) GL intersecting the plurality of data lines DL are arranged. The display portion 400 is provided with a plurality of pixel forming sections 4 arranged in a matrix shape along the plurality of data lines DL and the plurality of gate lines GL, and each pixel forming section 4 corresponds to one of the plurality of data lines DL and one of the plurality of gate lines GL.

Figure 2:
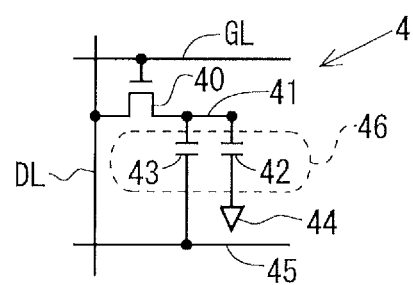
FIG. 2 is a circuit diagram illustrating an electrical configuration of a pixel forming section in the first embodiment.

FIG. 2 is a circuit diagram illustrating an electrical configuration of one pixel forming section 4. The pixel forming section 4 includes a pixel thin film transistor (TFT) 40 serving as a switching element in which a gate terminal is connected to a gate line GL passing through a corresponding intersection and a source terminal is connected to a data line DL passing through the intersection, a pixel electrode 41 connected to a drain terminal of the pixel TFT 40, a common electrode 44 and an auxiliary capacitance electrode 45 provided in common to a plurality of the pixel forming sections 4 formed in the display portion 400, a liquid crystal capacitance 42 formed by the pixel electrode 41 and the common electrode 44, and an auxiliary capacity 43 formed by the pixel electrode 41 and the auxiliary capacitance electrode 45. A pixel capacitance 46 includes the liquid crystal capacitance 42 and the auxiliary capacity 43. Note that the configuration of the pixel forming section 4 is not limited to the configuration illustrated in FIG. 2, and a configuration in which the auxiliary capacity 43 and the auxiliary capacitance electrode 45 are not provided, for example, may be employed. The common electrode 44 is also used as an electrode for the touch position detection. Thus, the common electrode 44 is divided into a plurality of electrodes in a segment shape (see FIG. 3 described later).

As the pixel TFT 40, a thin film transistor (a-Si TFT) using amorphous silicon in the semiconductor layer, a thin film transistor using micro-crystalline silicon in the semiconductor layer, a thin film transistor (oxide TFT) using an oxide semiconductor in the semiconductor layer, a thin film transistor (LTPS-TFT) using low-temperature polysilicon in the semiconductor layer, and the like can be employed. As the oxide TFT, for example, a thin film transistor including an oxide semiconductor layer including an In—Ga—Zn—O based semiconductor (for example, indium gallium zinc oxide) can be employed. The above-described structure also applies to the thin film transistors in the gate driver 200. In the present embodiment, it is assumed that oxide TFTs are used for both the thin film transistor as the pixel TFT 40 and the thin film transistors in the gate driver 200. Note that off-leakage can be reduced by employing the oxide TFT.

An operation outline of the display device according to the present embodiment configured as illustrated in FIG. 1 will be described below. The display control circuit 100 receives an image signal DAT and a timing control signal TG transmitted from the outside, and outputs a digital video signal DV, a scanning side control signal GCTL for controlling an operation of the gate driver 200, and a data side control signal DCTL for controlling an operation of the data driver 300. The scanning side control signal GCTL includes a gate start pulse signal, a gate clock signal, a suspension control signal VTP and VTPB for the scan suspension to be described later, and the like. The data side control signal DCTL includes a data start pulse signal, a data clock signal, and a latch strobe signal. Note that the gate clock signal is a signal that alternately repeats an H level corresponding to an active state and an L level corresponding to a non-active state, except for a period in which the clock operation stops for the scan suspension to be described later.

The gate driver 200 repeats application of an active scanning signal to each of the gate lines GL with one frame period (one vertical scanning period) as a cycle, based on the scanning side control signal GCTL transmitted from the display control circuit 100. In other words, the gate driver 200 scans the gate lines GL. Note that, when the touch position detection processing is performed, the scan suspension is performed.

The data driver 300 applies a data signal as a driving video signal to the data lines DL based on the digital video signal DV and the data side control signal DCTL transmitted from the display control circuit 100. At this time, in the data driver 300, the digital video signals DV indicating voltages each to be applied to a respective one of the data lines DL are sequentially held at a timing when a pulse of the data clock signal is generated. Then the held digital video signals DV for one pixel row are converted into analog voltages at a timing when a pulse of the latch strobe signal is generated. The converted analog voltages are simultaneously applied, as data signals for one pixel row, to all of the data lines DL.

As described above, the scanning signal is applied to the gate lines GL and the data signal is applied to the data lines DL, and as a result, an image corresponding to the image signal DAT transmitted from the outside is displayed on the display portion 400.

1.2 Configuration and Operation of Touch Panel

Figure 3:
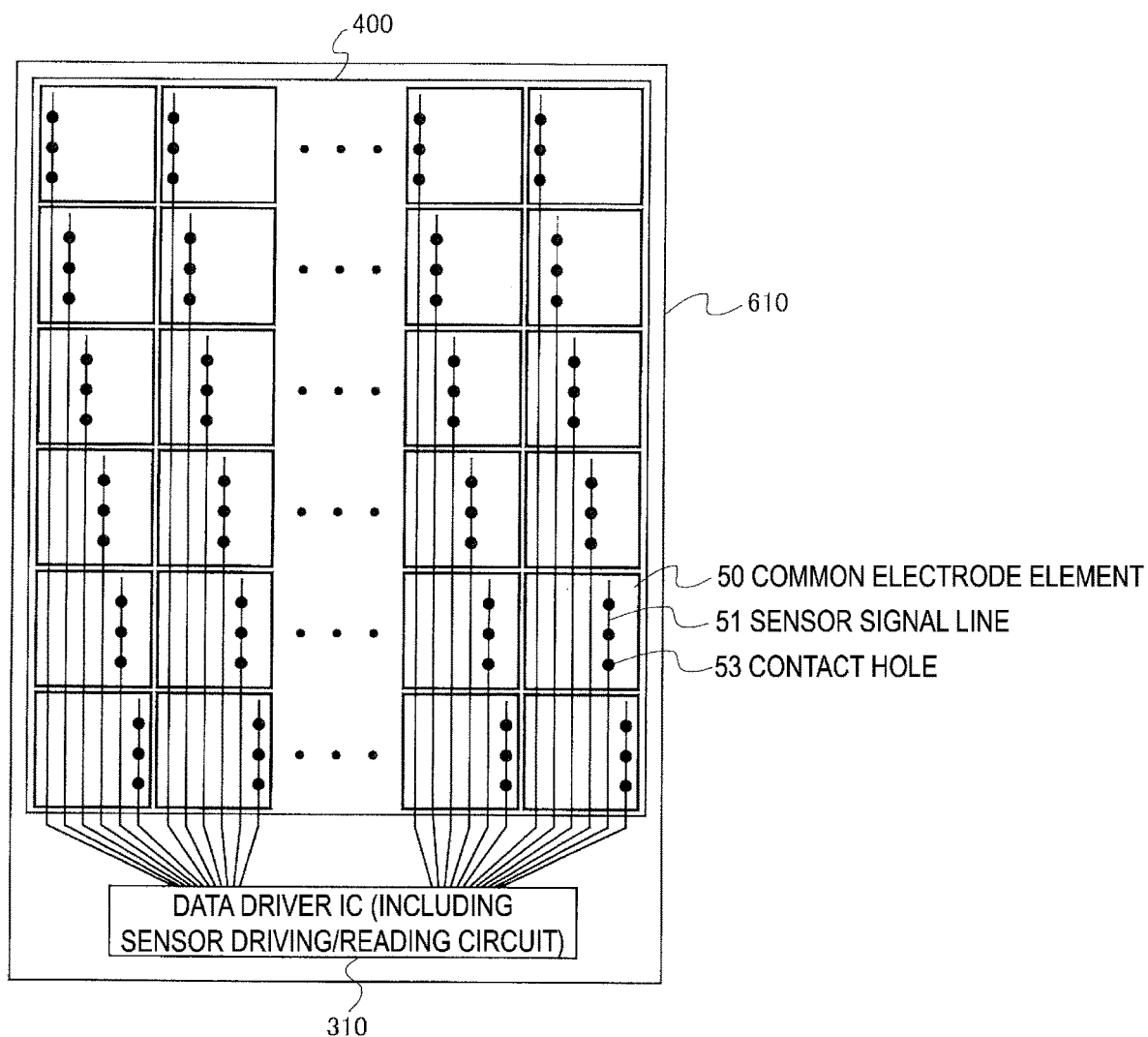
FIG. 3 is a schematic view for describing a configuration example of a touch panel in the first embodiment.

FIG. 3 is a schematic view for describing a configuration example of a touch panel in the present embodiment. The liquid crystal panel functioning as the display portion 400 in the present embodiment includes an active matrix substrate 610, on which the pixel forming sections 4, a plurality of (m) data lines DL(1) to DL(m), a plurality of (n) gate lines GL(1) to GL(n) intersecting the plurality of data lines DL(1) to DL(m), the gate driver 200, and the like are formed. A plurality of common electrode elements 50 each having a rectangular shape are arranged in a matrix shape on the active matrix substrate 610. One common electrode element 50 has, for example, a substantially square shape with one side being several millimeters, and is larger than a pixel electrode.

A data driver IC (also referred to as "source driver IC") 310 is mounted in a frame region of the active matrix substrate 610. The data driver IC 310 not only functions as the data driver 300 in the present embodiment but also includes a sensor driving/reading circuit for implementing a function of the touch panel. In the active matrix substrate 610, a plurality of sensor signal lines 51 are also arranged each being in one-to-one correspondence with a respective one of the plurality of common electrode elements 50 and extending parallel to the data lines DL. Each common electrode element 50 is electrically connected to a sensor signal line 51 corresponding to the common electrode element 50 by several contact holes 53, and is connected to the data driver IC 310 via the corresponding sensor signal line 51. Each common electrode element 50 is used to apply a voltage for image display between the common electrode element 50 and the pixel electrode, and is also used to form a capacitance for detecting a touch position. Note that the plurality of common electrode elements 50 each correspond to the common electrode 44 illustrated in FIG. 2.

Figure 4:
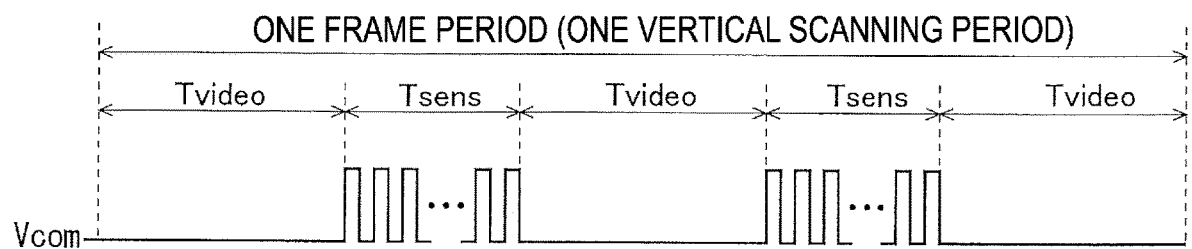
FIG. 4 is a timing chart for describing a schematic operation of the touch panel in the first embodiment.

FIG. 4 is a timing chart for describing a schematic operation of the touch panel in the present embodiment. As illustrated in FIG. 4, the display device according to the present embodiment is configured such that, in one frame period (one vertical scanning period), an image writing period Tvideo in which data for image display is written to the liquid crystal panel and a pause period Tsens of a scan for the touch position detection on the display portion 400 constituting the liquid crystal panel appear alternately.

In the image writing period Tvideo, the data driver IC 310 drives the data lines DL(1) to DL(m) in conjunction with the driving of the gate lines GL(1) to GL(n) by the gate driver in a state in which a DC voltage is supplied as a common voltage Vcom to the common electrode elements 50 by the sensor signal line 51, and thus each piece of pixel data representing the display image is written into the corresponding pixel forming section 4 as the data voltage.

On the other hand, in the pause period Tsens for the touch position detection, the data driver IC 310 supplies an AC signal having a constant amplitude to each of the common electrode elements 50 by the sensor signal line 51 in a state in which driving of the gate lines GL(1) to GL(n) and the data lines DL(1) to DL(m) stops. When a finger or the like of a person touches a display region 500 in the liquid crystal panel, capacitance is formed between the common electrode element 50 and the finger or the like of the person at the touched position. The data driver IC 310 detects a change in capacitance in the common electrode element 50 at the touched position (touch position), based on the above-described AC signal. In this way, the function of the touch panel is implemented by detecting the change in capacitance in the common electrode element 50 at the touch position.

1.3 Configuration of Gate Driver

Figure 5A:
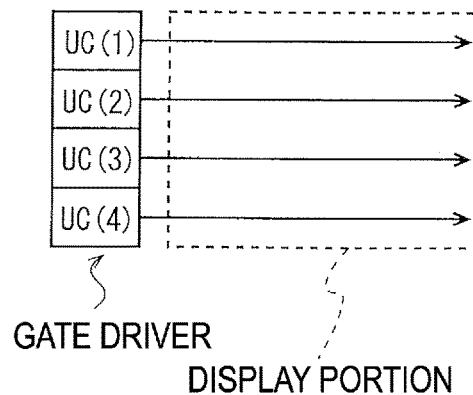
FIG. 5A is a schematic view for describing a gate driver of a one-side input and one-side arrangement system.
Figure 5B:
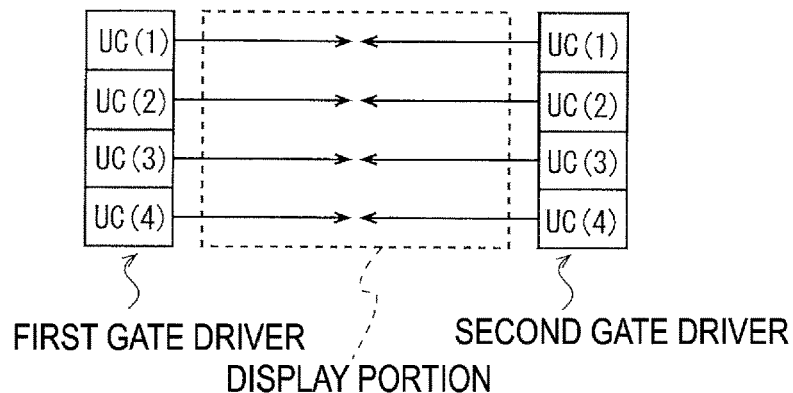
FIG. 5B is a schematic view for describing a gate driver of a both-side input and both-side arrangement system.
Figure 5C:
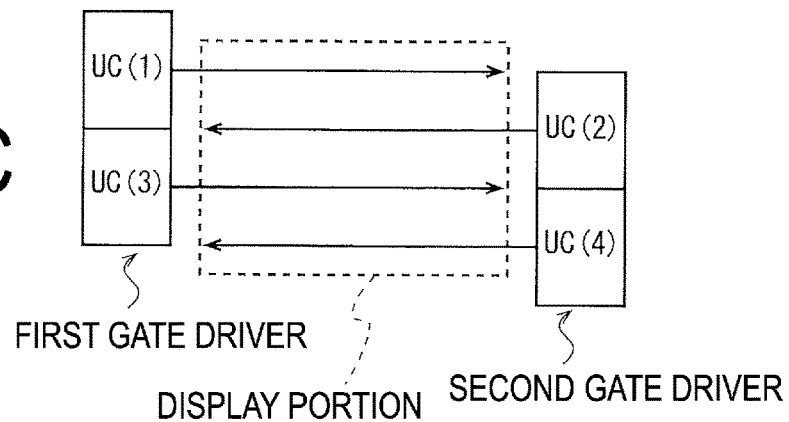
FIG. 5C is a schematic view for describing a gate driver of a one-side input and both-side arrangement system.

As described above, the gate driver 200 supplies the scanning signal to each gate line GL(i) in the display portion 400 (i=1 to n). In general, three systems illustrated in FIGS. 5A to 5C are known as systems for supplying the scanning signal from the gate driver to each gate line. Note that in FIGS. 5A to 5C, for the sake of convenience, it is assumed that the number of gate lines arranged in the display portion is four, and the gate driver includes a shift register in which four unit circuits UC(1) to UC(4) each connected to a respective one of the four gate lines are cascade-connected.

FIG. 5A is a schematic view illustrating a one-side input and one-side arrangement system which is a first system of the three systems. In the first system, a gate driver is arranged on one side of the display portion, and the scanning signal is applied from the gate driver to only one end of each gate line. FIG. 5B is a schematic view illustrating a both-side input and both-side arrangement system which is a second system of the three systems. In the second system, first and second gate drivers are disposed on one end side and the other end side of the display portion, respectively, each of the first and second gate drivers including the four unit circuits UC(1) to UC(4). The scanning signal is applied from the first and second gate drivers to one end and the other end of each gate line, respectively. FIG. 5C is a schematic view illustrating a one-side input and both-side arrangement system which is a third system of the three methods. In the third system, a first gate driver including the odd-numbered unit circuits UC(1) and UC(3) and a second gate driver including the even-numbered unit circuits UC(2) and UC(4) are arranged on one end side and the other end side of the display portion, respectively. The scanning signal is applied from the first and second gate drivers to one end and the other end of each gate line, respectively. In the present embodiment, any of the above-described three systems can be employed, but in the following description, the gate driver 200 in the present embodiment will be described assuming that the one-side input and one-side arrangement system illustrated in FIG. 5A is employed. Note that, as described above, n (n is an integer of 2 or more) gate lines GL(1) to GL(n) are arranged in the display portion 400.

Figure 6:
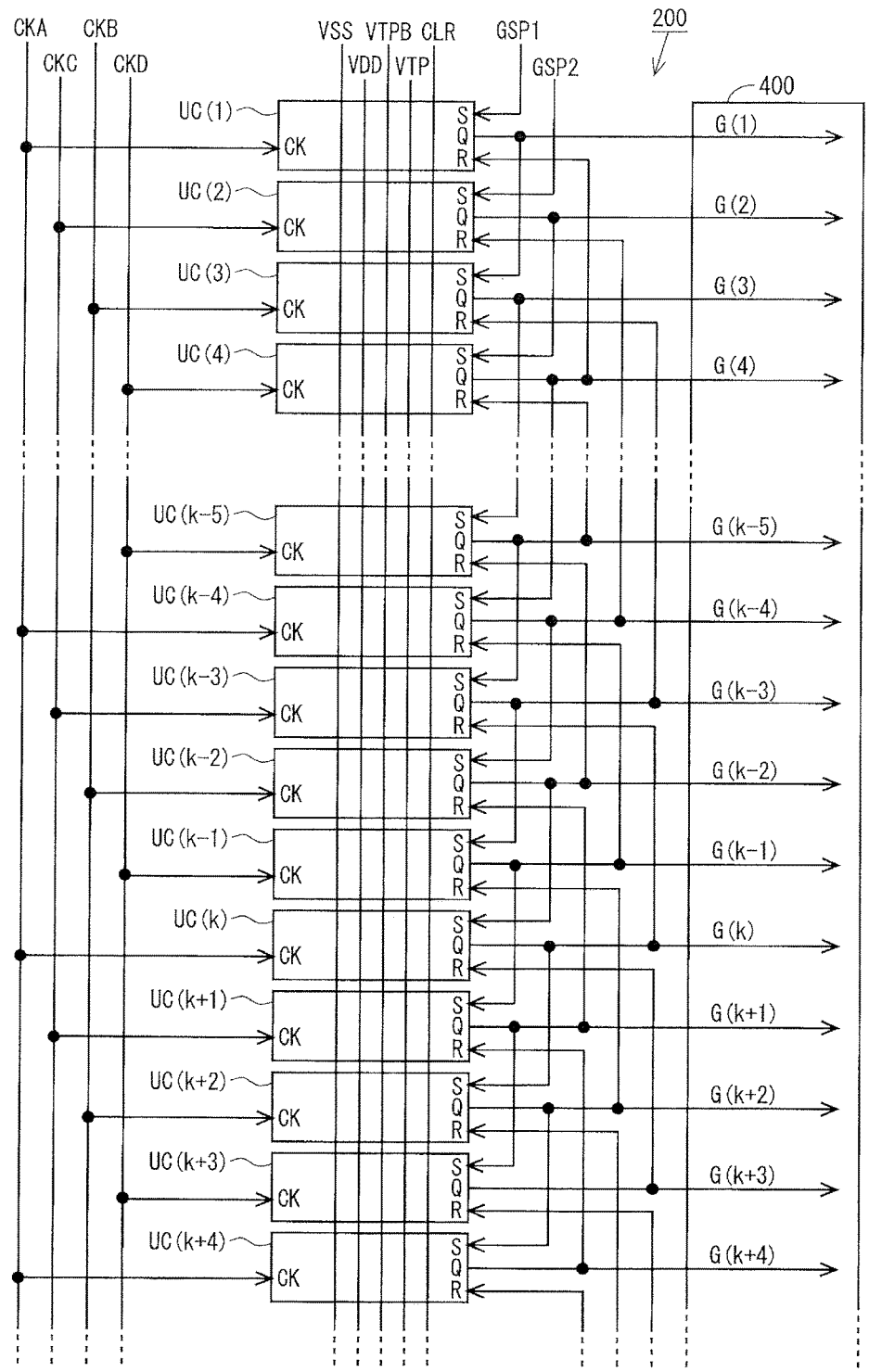
FIG. 6 is a circuit diagram illustrating a configuration of a gate driver in the first embodiment.

FIG. 6 is a circuit diagram illustrating a configuration of the gate driver 200 in the present embodiment. The gate driver 200 includes n unit circuits UC(1) to UC(n) corresponding to the n gate lines GL(1) to GL(n), respectively, in the display portion 400, and each unit circuit UC(i) functions as a bistable circuit. The n unit circuits UC(1) to UC(n) are cascade-connected as illustrated in FIG. 6 and operate as an n-stage shift register. Note that, in the following description, when the n unit circuits UC(1) to UC(n) are not distinguished from each other, the unit circuits included in the shift register are each denoted by a symbol "UC".

As illustrated in FIG. 6, gate start pulse signals GSP1 and GSP2, clear signals CLR and CLR1 to CLR3, gate clock signals CKA, CKB, CKC, and CKD, and suspension control signals VTP and VTPB are supplied to the gate driver 200 as the scanning side control signals GCTL. A high-level power supply voltage VDD and a low-level power supply voltage VSS are also supplied to the gate driver 200. The gate clock signals CKA, CKB, CKC, and CKD are a four-phase clock signal. Note that, of the suspension control signals VTP and VTPB, the signal VTP is a signal (hereinafter referred to as a "suspension state signal") which is active during the pause period of the scan and is non-active in a period other than the pause period, and that the signal VTPB is a signal (hereinafter referred to as a "drive state signal") which is active during a normal drive period and is non-active in a period other than the normal drive period, the normal drive period being a period in which a scan is performed other than the pause period.

In the gate driver 200, the following signal is supplied to each unit circuit UC(i) (see FIG. 6). The gate clock signal CKA is supplied as the input clock signal CK to the unit circuit UC(1), the gate clock signal CKC is supplied as the input clock signal CK to the unit circuit UC(2), the gate clock signal CKB is supplied as the input clock signal CK to the unit circuit UC(3), and the gate clock signal CKD is supplied as the input clock signal CK to the unit circuit UC(4). Such a configuration is repeated for the input of the gate clock signal to the unit circuit UC(i). That is, the four gate clock signals CKA, CKC, CKB, and CKD cyclically correspond to the unit circuits UC(1) to UC(n) included in the gate driver 200, and a corresponding gate clock signal CKX (X is any one of A, B, C, and D) is input to each unit circuit UC(i).

An output signal Q of a unit circuit UC(p−2) of a (p−2)-th stage is supplied as a set signal S to a unit circuit UC(p) of a p-th stage, where p is an integer of 3≤p≤n. An output signal Q of a unit circuit UC(q+3) of a (q+3)-th stage is supplied as a reset signal R to a unit circuit UC(q) of a q-th stage, where q is an integer of 1≤q≤n−3. Note that the first gate start pulse signal GSP1 is supplied as the set signal S to the unit circuit UC(1), the second gate start pulse signal GSP2 is supplied as the set signal S to the unit circuit UC(2), the first clear signal CLR1 is supplied as the reset signal R to the unit circuit UC(n−2), the second clear signal CLR2 is supplied as the reset signal R to the unit circuit UC(n−1), and the third clear signal CLR3 is supplied as the reset signal R to the unit circuit UC(n). The low-level power supply voltage VSS, the high-level power supply voltage VDD, the suspension control signals VTP and VTPB, and the clear signal CLR are supplied in common to all the unit circuits. Here, the first to third clear signals CLR1 to CLR3 are signals corresponding to output signals Q of the unit circuits of the (n+1)-th, (n+2)-th, and (n+3)-th stages when it is assumed that the gate driver 200 operates as the (n+3)-stage shift register. The clear signal CLR is a signal that is active (H level) only for a predetermined period after completion of a scan in a frame period and before start of a scan in the next frame period.

1.4 Configuration of Unit Circuit

1.4.1 Configuration of Unit Circuit as First Comparative Example

Figure 7:
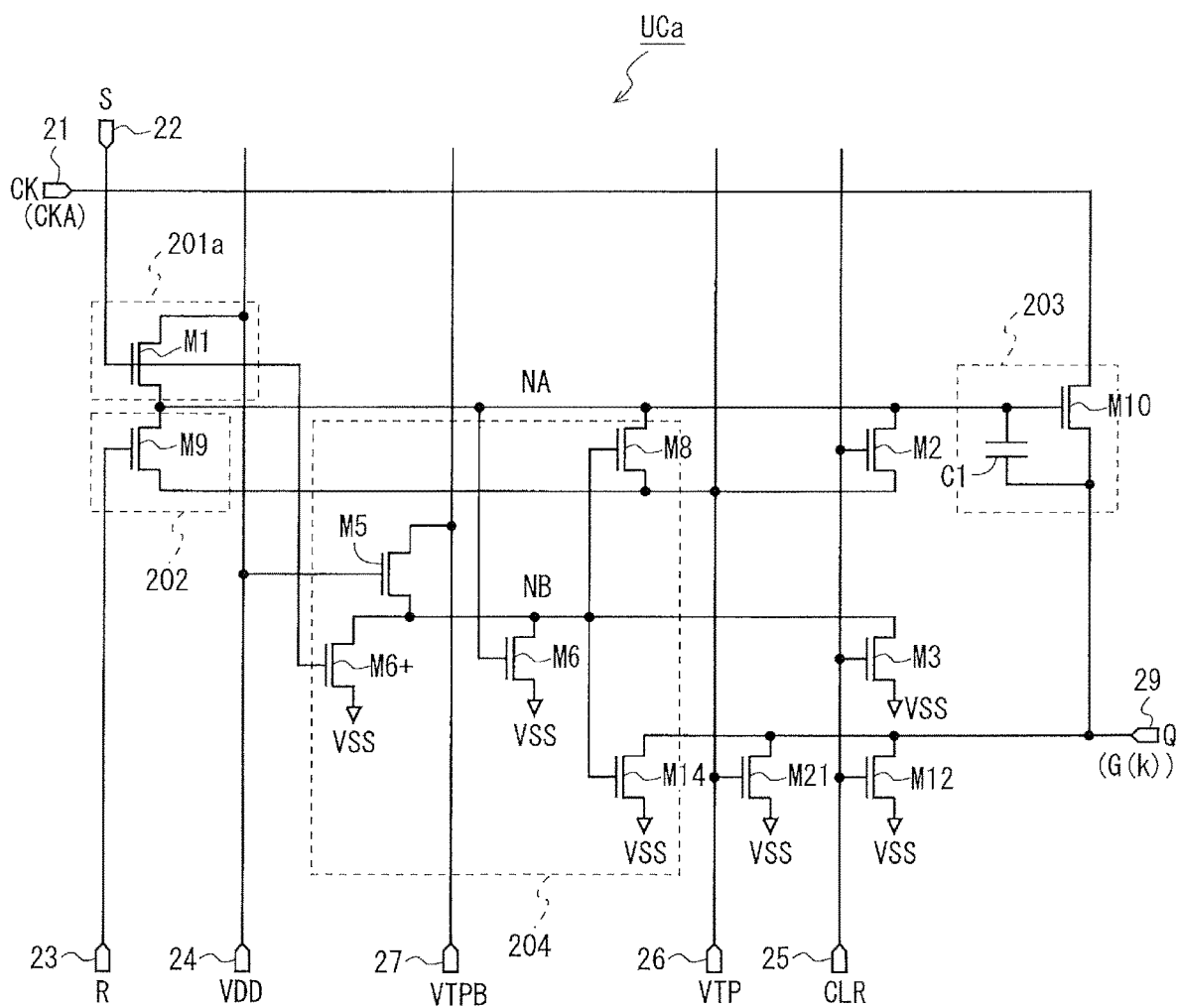
FIG. 7 is a circuit diagram illustrating a configuration of a unit circuit as a first comparative example usable in the gate driver illustrated in FIG. 6.

Before describing the configuration of the unit circuit UC included in the gate driver 200 in the present embodiment, a configuration of a unit circuit as a comparative example usable in the gate driver 200 will be described. FIG. 7 is a circuit diagram illustrating a configuration of a unit circuit UCa as a first comparative example. The unit circuit UCa is a unit circuit configured based on a known technique without using a characteristic configuration (see FIG. 9 described later) of the unit circuit UC in the present embodiment. Note that, unless otherwise specified, all the transistors included in the unit circuit UCa are enhancement type oxide TFTs. The same applies to a unit circuit UCb as a second comparative example to be described later and the unit circuit UC in the present embodiment (see FIGS. 9 and 10).

As illustrated in FIG. 7, the unit circuit UCa includes input terminals 21 to 23, 25 to 27, an output terminal 29, and a power source terminal 24, and includes 12 transistors M1 to M3, M5, M6, M6+, M8 to M10, M12, M14, M21, and one capacitor C1. The input terminal 21 is a clock input terminal for receiving the clock signal CK (hereinafter also referred to as "input clock signal CK"), the input terminal 22 is a set input terminal for receiving the set signal, the input terminal 23 is a reset input terminal for receiving the reset signal, the input terminal 25 is a clear input terminal for receiving the clear signal CLR, the input terminal 26 is a first control input terminal for receiving a suspension state signal VTP as the suspension control signal, the input terminal 27 is a second control input terminal for receiving the drive state signal VTPB as the suspension control signal, the output terminal 29 is a terminal for outputting, as the scanning signal, the output signal Q of the unit circuit UCa, and the power source terminal 24 is a high-level power source terminal for receiving the high-level power supply voltage VDD. Note that, in the gate driver 200, a reference power source line (denoted by the same symbol "VSS" as the low-level power supply voltage) for supplying a low-level power supply voltage VSS as a reference voltage to all the unit circuits UCa is arranged, and that, as illustrated in FIG. 7, some transistors included in each unit circuit UCa are connected to the reference power source line VSS.

The unit circuit UCa as the first comparative example is a bistable circuit corresponding to any one (the k-th gate line GL(k) in the example in FIG. 7) of the n gate lines GL(1) to GL(n) arranged in the display portion 400. The unit circuit UCa determines the state of the unit circuit based on the set signal S and the reset signal R supplied as input signals, and outputs, as the scanning signal G (k) to be applied to the corresponding gate line GL(k), the output signal Q for causing the gate line GL(k) to be in the select state or the non-select state according to the state of the unit circuit.

As illustrated in FIG. 7, the unit circuit UCa includes an internal node NA that selectively holds a voltage of a high level (H level) as the first logic level or a voltage of a low level (L level) as the second logic level indicating a state of the unit circuit. The internal node NA is connected to the high-level power source terminal 24 via the transistor M1 serving as a switching element constituting a set circuit 201a, and is connected to the first control input terminal 26 supplied with the suspension state signal VTP via a resetting transistor M9 serving as a switching element constituting a reset circuit 202. That is, a drain terminal and a source terminal of the setting transistor M1 are connected to the high-level power source terminal 24 and the internal node NA, respectively, and a drain terminal and a source terminal of the resetting transistor M9 are connected to the internal node NA and the first control input terminal, respectively. A gate terminal of the transistor M1 is connected to the set input terminal 22, and a gate terminal of the transistor M9 is connected to the reset input terminal 23. The transistor M10 and the capacitor C1 constitute an output circuit 203. The transistor M10 includes a drain terminal connected to the clock input terminal 21, a source terminal connected to the output terminal 29, and a gate terminal connected to the internal node NA. The capacitor C1 includes a first terminal and a second terminal connected to the gate terminal and the source terminal of the transistor M10, respectively.

In the unit circuit UCa, the transistors M5, M6, M6+, M8, and M14 constitute a stabilizing circuit 204. The stabilizing circuit 204 is provided for preventing voltage fluctuation of the internal node NA and stabilizing the output signal Q so that the transistor M10 of the output circuit is reliably maintained in the off state during the period in which the transistor M10 is to be in the off state, and includes a stabilizing node NB. As illustrated in FIG. 7, in this stabilizing circuit, the transistor M5 serving as a switching element includes a drain terminal connected to the second control input terminal 27, a source terminal connected to the stabilizing node NB, and a gate terminal connected to the high-level power source terminal 24. The drive state signal VTPB of the suspension control signals VTP and VTPB is supplied to the second control input terminal 27, and the high-level power supply voltage VDD corresponding to the on-voltage for turning on the transistor M5 is supplied to the high-level power source terminal 24. The stabilizing node NB is connected to the reference power source line VSS via the transistor M6 serving as a switching element, and the gate terminal of the transistor M6 is connected to the internal node NA. The internal node NA is connected to the first control input terminal 26 via the transistor M8 serving as a switching element, and the gate terminal of the transistor M8 is connected to the stabilizing node NB. The suspension state signal VTP of the suspension control signals VTP and VTPB is supplied to the first control input terminal 26. The output terminal 29 is connected to the reference power source line VSS via the transistor M14 serving as a switching element, and a gate terminal of the transistor M14 is connected to the stabilizing node NB.

In the unit circuit UCa, the gate terminal of each of the transistors M2, M3, and M12 serving as switching elements is connected to the clear input terminal 25. The internal node NA is connected to the first control input terminal 26 via the transistor M2. The stabilizing node NB and the output terminal 29 are connected to the reference power source line VSS via the transistors M3 and M12, respectively.

Further, in the unit circuit UCa, the gate terminal of the transistor M21 serving as a switching element is connected to the first control input terminal 26 for receiving the suspension state signal VTP, and the output terminal 29 is connected to the reference power source line VSS via the transistor M21.

1.4.2 Configuration of Unit Circuit as Second Comparative Example

In the first comparative example, when an L-level voltage is input as the set signal S while an H-level voltage is held at the internal node NA in the unit circuit UCa, as can be seen from the configuration illustrated in FIG. 7, in the setting transistor M1 including a gate terminal connected to the set input terminal 22, the H-level voltage is supplied to the source and drain terminals and the L-level voltage is supplied to the gate terminal, and thus a negative voltage stress is applied to the setting transistor M1 and a threshold shift in a direction to decrease the threshold value occurs in the setting transistor M1. In order to avoid such a threshold shift, it is conceivable that the setting transistor M1 constituting the set circuit 201a is in the diode-connected form. Hereinafter, such a unit circuit will be described as a second comparative example.

Figure 8:
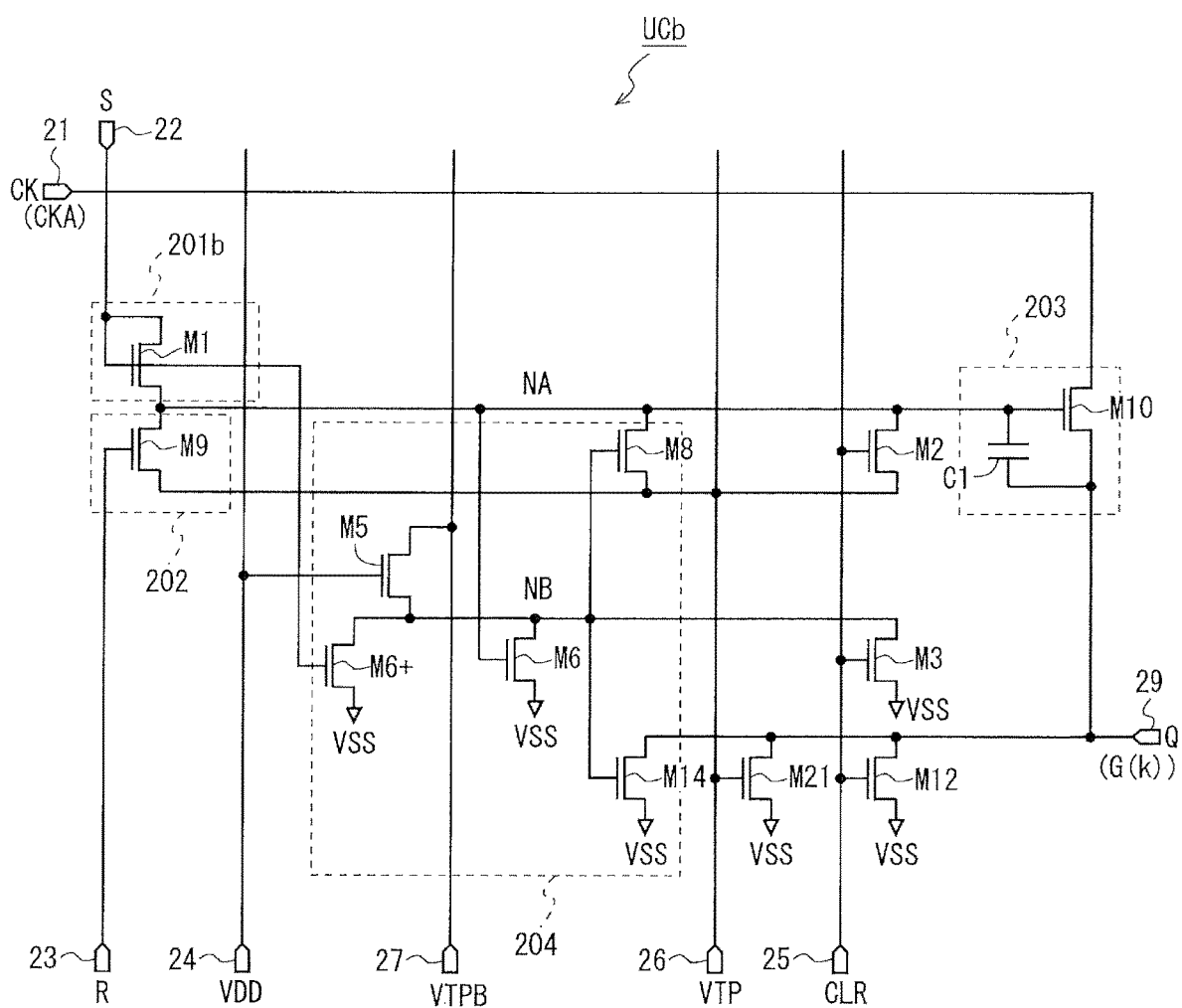
FIG. 8 is a circuit diagram illustrating a configuration of a unit circuit as a second comparative example usable in the gate driver illustrated in FIG. 6.

FIG. 8 is a circuit diagram illustrating a configuration of a unit circuit UCb serving as the second comparative example usable in the gate driver 200 illustrated in FIG. 6. In this unit circuit UCb, the configuration (hereinafter referred to as "VDD-connected configuration") of the set circuit 201a in the unit circuit UCa as the first comparative example illustrated in FIG. 7 is changed to a configuration (hereinafter referred to as "diode-connected configuration") of a set circuit 201b in the unit circuit UCb illustrated in FIG. 8. The configuration of the unit circuit UCb as the second comparative example is the same as the configuration of the unit circuit UCa as the first comparative example, except for the configuration of the set circuit 201b. Thus, in the configurations other than the set circuit 201b in the unit circuit UCb, the same or corresponding parts are denoted by the same reference numerals, and description thereof is omitted.

1.4.3 Configuration of Unit Circuit of Present Embodiment

As described above, in the unit circuit UCb as the second comparative example, the threshold shift of the setting transistor M1 in the set circuit 201b can be avoided. However, in the unit circuit UCb, as illustrated in FIG. 8, the setting transistor M1 is in the diode-connected form, and thus with the unit circuit UCb used in the gate driver of the display device provided with the in-cell touch panel, the leakage current is generated when the transistor M1 is in the off state. Thus, the pause period having the sufficient length for the touch position detection cannot be provided. Thus, the unit circuit UC in the present embodiment is configured as follows in order to ensure the pause period having the sufficient length for the touch position detection while avoiding a problem of the threshold shift of the setting transistor M1 in the first comparative example.

Figure 9:
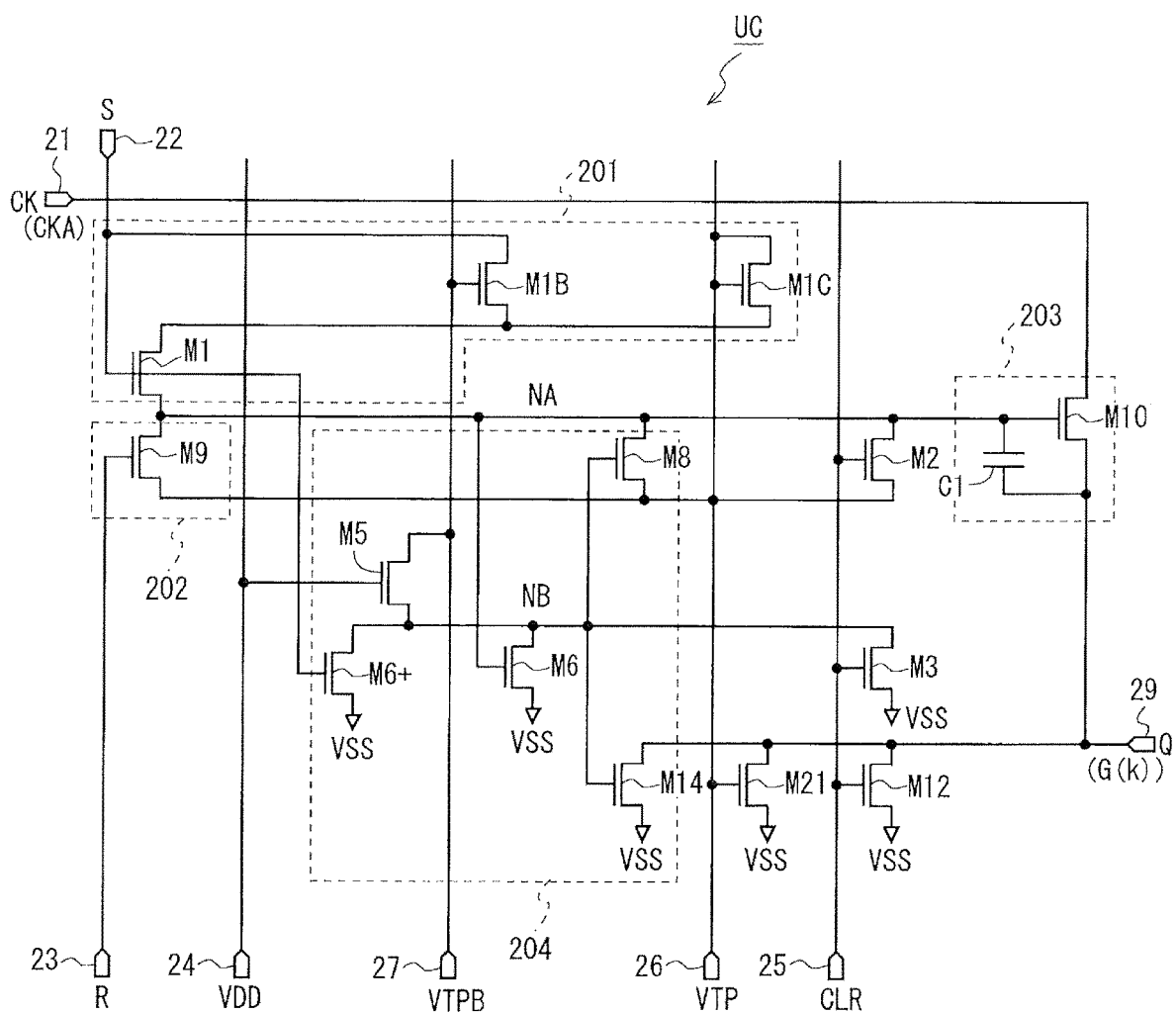
FIG. 9 is a circuit diagram illustrating a configuration of a unit circuit used in the gate driver in the first embodiment.

FIG. 9 is a circuit diagram illustrating a configuration of the unit circuit UC used in the gate driver 200 in the present embodiment. This unit circuit UC is obtained by replacing the set circuit 201a in the unit circuit UCa as the first comparative example illustrated in FIG. 7 with a set circuit 201 illustrated in FIG. 9. The configuration of the unit circuit UC in the present embodiment is the same as the configuration of the unit circuit UCa as the first comparative example, except for the set circuit 201. Thus, in the configurations other than the set circuit 201 in the unit circuit UC, the same or corresponding parts are denoted by the same reference numerals, and description thereof is omitted.

Unlike the set circuit 201a of the unit circuit UCa as the first comparative example and the set circuit 201b of the unit circuit UCb as the second comparative example, the set circuit 201 of the unit circuit UC in the present embodiment includes transistors M1B and M1C in addition to the setting transistor M1. Hereinafter, the transistors M1B and M1C are referred to as a "first auxiliary transistor M1B" and a "second auxiliary transistor M1C", respectively. As illustrated in FIG. 9, the setting transistor M1 includes a source terminal connected to the internal node NA, and a gate terminal connected to the set input terminal 22. The first auxiliary transistor M1B includes a drain terminal connected to the set input terminal 22, a source terminal connected to the drain terminal of the setting transistor M1, and a gate terminal connected to the second control input terminal 27. The drive state signal VTPB is supplied to the second control input terminal 27. The second auxiliary transistor M1C includes a drain terminal and a gate terminal that are connected to the first control input terminal 26 and a source terminal connected to the drain terminal of the setting transistor M1, and is in the diode-connected form. The suspension state signal VTP is supplied to the first control input terminal 26.

According to the set circuit 201 having such a configuration, when the suspension state signal VTP is at the L level and the drive state signal VTPB is at the H level, the first auxiliary transistor M1B is in the on state, and thus the setting transistor M1 is in a form in which the drain and gate terminals are connected to each other, that is, the diode-connected configuration. On the other hand, when the suspension state signal VTP is at the H level and the drive state signal VTPB is at the L level, the first auxiliary transistor M1B is in the off state, and a voltage at the H level is supplied from the second auxiliary transistor M1C to the drain terminal of the setting transistor M1. Thus, it can be considered that the set circuit 201 is in the diode-connected configuration when the suspension state signal VTP is at the L level and the drive state signal VTPB is at the H level, and the set circuit 201 is in the VDD-connected configuration when the suspension state signal VTP is at the H level and the drive state signal VTPB is at the L level. Note that the suspension state signal VTP and the drive state signal VTPB do not both turn to be at the H level at the same time.

1.5 Operation of Gate Driver

Figure 10:
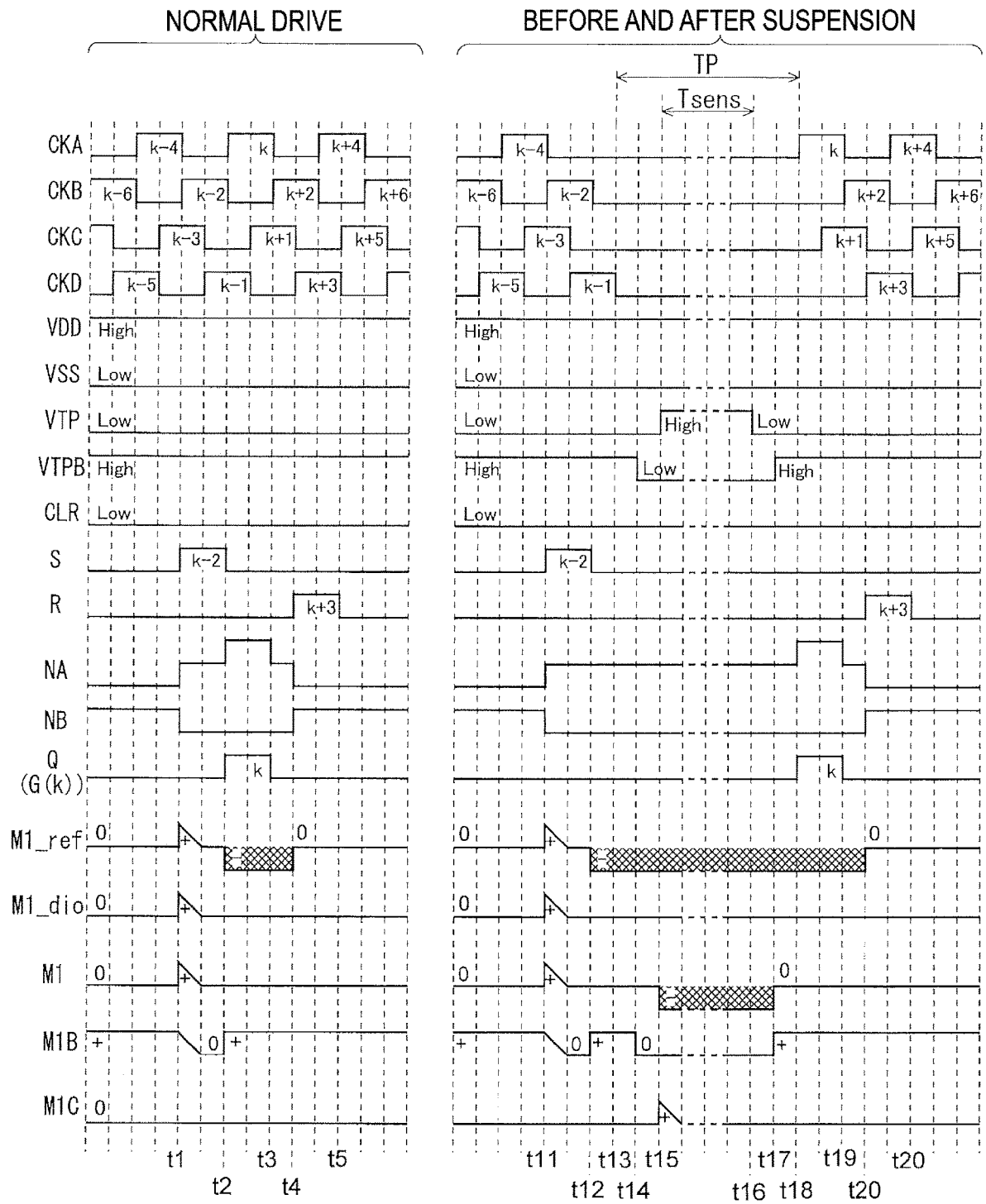
FIG. 10 is a signal waveform diagram for describing an operation of the gate driver in the first embodiment.

Next, an operation of the gate driver 200 will be described. FIG. 10 is a signal waveform diagram for describing the operation of the gate driver 200. Hereinafter, first, an operation when the scan suspension is not performed, that is, an operation in the normal drive will be described, and then an operation when the scan suspension is performed (operation before and after the suspension) will be described.

1.5.1 Operation in Normal Drive

First, referring to FIG. 10 together with FIGS. 7, 8, and 9, the operation in the normal drive of the gate driver 200 will be described in consideration of a case where each of the unit circuit UCa (FIG. 7) as the first comparative example, the unit circuit UCb (FIG. 8) as the second comparative example, and the unit circuit UC (FIG. 9) in the present embodiment is used. While the normal drive is performed, the suspension state signal VTP is maintained at the L level, and the drive state signal VTPB is maintained at the H level. Here, focusing on the unit circuit of the k-th stage in the shift register constituting the gate driver 200, FIG. 7 illustrates the unit circuit UCa(k) of the k-th stage as the first comparative example, FIG. 8 illustrates the unit circuit UCb(k) of the k-th stage as the second comparative example, and FIG. 9 illustrates the unit circuit UC(k) of the k-th stage in the present embodiment. Whether the unit circuit UCa, UCb, or UC is used in the gate driver 200, the gate clock signal CKA is supplied as the input clock signal CK to the clock input terminal 21 of the unit circuit UCa(k), UCb(k), or UC(k) of the k-th stage (see FIG. 6). Note that, in the following description, when the unit circuit UCa as the first comparative example, the unit circuit UCb as the second comparative example, and the unit circuit UC in the present embodiment are not distinguished from each other, they are referred to as "unit circuit UCx", "unit circuit UCx(k) of the k-th stage", or the like.

The output signal Q of the unit circuit of two stages before, that is, the unit circuit UCx(k−2) of the (k−2)-th stage is input to the set input terminal 22 of such a unit circuit UCx(k) of the k-th stage (see FIG. 6). Note that, when k<3, the first and second gate start pulse signals GSP1 and GSP2 corresponding to the output signals of the unit circuits of two stages before the unit circuits UCx(k) (k=1, 2) are supplied to the respective set input terminals 22. The output signal Q of the unit circuit of three stages after, that is, the unit circuit UCx(k+3) of the (k+3)-th stage is input to the reset input terminal 23 of such a unit circuit UCx(k) of the k-th stage (see FIG. 6). Note that, when k>n−3, the first to third clear signals CLR1, CLR2, and CLR3 corresponding to the output signals of the unit circuits of three stages after the unit circuits UCx(k) (k=n−2, n−1, n) are supplied to the respective reset input terminals 23. Hereinafter, for convenience of description, it is assumed that 3≤k≤n−3.

In the unit circuit UCx(k), as illustrated in FIG. 10, the transistors M1 and M9 are both in the off state during a period, before time t1, in which the set signal S and the reset signal R supplied to the set input terminal 22 and the reset input terminal 23, respectively, are both at the L level. At this time, in the stabilizing circuit 204, the transistor M6+ is in the off state and the transistor M5 is in the on state, and thus the voltage at the H level as the first logic level is held at the stabilizing node NB. Thus, the transistors M8 and M14 are in the on state. As a result, the voltage of the internal node NA and the voltage of the output terminal 29 are the low-level power supply voltage VSS and the voltage of the suspension state signal VTP, respectively, and are both at the L level.

As illustrated in FIG. 10, the output signal of the unit circuit of two stages before, that is, the output signal Q of the unit circuit UCx(k−2) of the (k−2)-th stage as the set signal S supplied to the set input terminal 22 rises from the L level to the H level at the time t1 and then falls to the L level at time t2.

In the unit circuit UCa(k) as the first comparative example illustrated in FIG. 7, when the set signal S is at the H level, the high-level power supply voltage VDD is supplied to the internal node NA via the transistor M1 in the on state, and the internal node NA is charged. In the unit circuit UCb(k) as the second comparative example illustrated in FIG. 8, when the set signal S is at the H level, the set signal S is supplied to the internal node NA via the transistor M1 in the diode-connected form, and the internal node NA is charged. In the unit circuit UC(k) in the present embodiment illustrated in FIG. 9, the first auxiliary transistor M1B is in the on state and the second auxiliary transistor M1C is in the off state in the set circuit 201 during the normal drive, and thus, when the set signal S is at the H level, the set signal S is supplied to the internal node NA via the transistor M1 in the diode-connected state and the internal node NA is charged. In this way, in any of the unit circuit UCa(k) as the first comparative example, the unit circuit UCb(k) as the second comparative example, and the unit circuit UC(k) in the present embodiment, when the set signal S is at the H level, the internal node NA is charged to the H level. More precisely, the internal node NA is charged to a level lower than a normal H level, that is, the level of the high-level power supply voltage VDD by the threshold voltage of the transistor M1.

In this way, when the voltage of the internal node NA turns to be at the H level, the transistor M10 of the output circuit 203 turns the on state. When the transistor M10 is in the on state, the gate clock signal CKA (hereinafter also referred to as "input clock signal CKA") supplied as the input clock signal CK to the clock input terminal 21 is output as the output signal Q from the output terminal 29, and the output signal Q is supplied as the scanning signal G(k) to the gate line GL(k). The input clock signal CKA changes from the L level to the H level at the time t2, so that the voltage of the internal node NA is pushed up via the capacitor C1 to be a voltage higher than the normal H level. As a result, the transistor M10 is completely in the on state, and the voltage of the scanning signal G(k) output to the gate line GL(k) is completely at the H level.

In the stabilizing circuit 204, when the set signal S turns to be at the H level at the time t1, the transistor M6+ turns the on state. When the voltage of the internal node NA turns to be at the H level as described above, the transistor M6 also turns the on state. At this time, the transistor M5 is in the on state and the drive state signal VTPB is at the H level, but channel sizes of the transistors M5, M6 and M6+ are set so that on-resistance of the transistor M5 is sufficiently higher than on-resistance of the transistors M6 and M6+. Thus, with the change of the transistors M6 and M6+ to be in the on state, the voltage of the stabilizing node NB changes from the H level as the first logic level to the L level as the second logic level, and the transistor M8 turns the off state.

Thereafter, at time t3, the input clock signal CKA changes from the H level to the L level, so that the scanning signal G(k) output from the output terminal 29 to the gate line GL(k) changes from the H level to the L level. The potential of the internal node NA decreases in response to the change of the input clock signal CKA from the H level to the L level.

Thereafter, at time t4, the output signal Q of the unit circuit UCx(k+3) of the (k+3)-th stage as the reset signal R supplied to the reset input terminal 23 of the unit circuit UCx(k) changes from the L level to the H level. Thus, the transistor M9 of the reset circuit 202 turns the on state, the suspension state signal VTP at the L level is supplied to the internal node NA, and the voltage of the internal node NA turns to be at the L level as the second logic level.

When the voltage of the internal node NA changes from the H level to the L level at the time t4, the transistor M6 turns the off state in the stabilizing circuit 204. The set signal S changes from the H level to the L level at the time t2, and thus the transistor M6+ is already in the off state. Thus, the drive state signal VTPB at the H level is supplied to the stabilizing node NB via the transistor M5, and turns a state of holding the voltage at the H level. As a result, the transistor M8 turns the on state, and the voltage of the internal node NA is stably maintained at the L level. When the voltage of the stabilizing node NB turns to be at the H level, the transistor M14 turns the on state, and thus the voltage of the gate line GL(k) connected to the output terminal 29 is also stably maintained at the L level. In this way, the stabilizing circuit 204 functions to prevent the voltage fluctuation of the internal node NA and stabilize the output signal Q (scanning signal G(k)) so that the transistor M10 of the output circuit 203 is reliably maintained in the off state during the period in which the gate line GL(k) is to be in the non-select state.

With the operation of the unit circuit UCx(k) as described above, the gate line GL(k) changes from the non-select state (L level) to the select state (H level) at the time t2, maintains the select state (H level) from the time t2 to the time t3, and changes from the select state (H level) to the non-select state (L level) at the time t3.

Each of the other unit circuits UCx(i) (i≠k, 1≤i≤n) in the gate driver 200 also operates in the similar manner according to the signals S, R, and CK each input to a corresponding one of the set input terminal 22, the reset input terminal 23, and the clock input terminal 21. As a result, in the gate driver 200, the pulses supplied by the first and second gate start pulse signals GSP1 and GSP2 are sequentially transferred by the shift register constituting the gate driver 200, and thus the gate lines GL(1) to GL(n) in the display portion 400 are sequentially selected for each predetermined period.

Note that the suspension state signal VTP supplied to the first control input terminal 26 is at the L level during the normal drive, and thus the transistor M21 is in the off state. The clear signal CLR supplied to the clear input terminal 25 is maintained at the L level during a scan of the gate lines GL, and turns to be at the H level only for a predetermined period after completion of a scan of all the gate lines GL in a frame period and before start of a scan in the next frame period. Thus, the transistors M2, M3 and M12 are in the off state during the scan of the gate lines GL, and when the clear signal CLR turns to be at the H level after the completion of the scan of all the gate lines GL, the transistors M2, M3 and M12 turn the on state, and the voltage of the gate line GL(k) connected to the internal node NA, the stabilizing node NB and the output terminal 29 turns to be at the L level. Such a function of the clear signal CLR suppresses an influence of the residual charge accumulated in the internal node NA or the like on the display of the subsequent frame.

1.5.2 Voltage Stress on Setting Transistor in Normal Drive

In the unit circuit UCx(k) included in the gate driver 200 that operates as described above, a voltage stress applied to the setting transistor M1, that is, a gate-source voltage Vgs in the setting transistor M1 will be described below. FIG. 10 illustrates the waveforms of the gate-source voltage Vgs of the setting transistor M1 in the first comparative example, the second comparative example, and the present embodiment. Specifically, in FIG. 10, "M1_ref" indicates a waveform of the gate-source voltage Vgs of the transistor M1 of the set circuit 201a (VDD-connected configuration) in the unit circuit UCa(k) as the first comparative example, "M1_dio" indicates a waveform of the gate-source voltage Vgs of the transistor M1 of the set circuit 201b (diode-connected configuration) in the unit circuit UCb(k) as the second comparative example, and "M1" indicates a waveform of the gate-source voltage Vgs of the transistor M1 of the set circuit 201 in the unit circuit UC(k) in the present embodiment. Here, the transistor M1 is an N-channel type transistor, and thus the gate-source voltage Vgs of the transistor M1 is a voltage of the gate terminal with reference to a lower voltage of the voltages of the two conduction terminals in the transistor M1. Note that FIG. 10 also illustrates waveforms of gate-source voltages of the first auxiliary transistor M1B and the second auxiliary transistor M1C included in the set circuit 201 in the present embodiment.

As illustrated in FIG. 10, in any of the unit circuit UCa(k) as the first comparative example, the unit circuit UCb(k) as the second comparative example, and the unit circuit UC(k)

in the present embodiment, in a period before the time t1, the set signal S and the reset signal R are both at the L level and the voltage of the internal node NA is also at the L level, and thus the gate-source voltage Vgs of the transistor M1 is 0V.

In the unit circuit UCa as the first comparative example (FIG. 7), as indicated by the voltage waveform of "M1_ref" in the "normal drive" in FIG. 10, the gate-source voltage Vgs of the transistor M1 changes to be at the H level when the set signal S rises from the L level to the H level at the time t1, but decreases toward 0V according to the charging of the internal node NA, and maintains 0V while the set signal S is at the H level after when the gate-source voltage Vgs reaches 0V. Thereafter, when the set signal S changes from the H level to the L level at the time t2, the gate-source voltage Vgs of the transistor M1 turns to be a negative value. That is, the transistor M1 turns a state in which a negative voltage bias is applied (hereinafter referred to as a "negative voltage bias state"). This negative voltage bias state continues until the reset signal R changes from the L level to the H level at the time t4. When the reset signal R changes to be at the H level at the time t4, the suspension state signal VTP at the L level is supplied to the internal node NA, and the voltage of the internal node NA turns to be at the L level. As a result, the gate-source voltage Vgs of the transistor M1 turns to be 0V, and the transistor M1 turns a state in which the voltage stress is not applied to the transistor M1.

In the unit circuit UCb as the second comparative example (FIG. 8), as indicated by the voltage waveform of "M1_dio" in the "normal drive" in FIG. 10, similarly to the first comparative example, the gate-source voltage Vgs of the transistor M1 changes to be at the H level when the set signal S rises from the L level to the H level at the time t1, but decreases toward 0V according to the charging of the internal node NA, and maintains 0V while the set signal S is at the H level after when the gate-source voltage Vgs reaches 0V. Thereafter, although the set signal S changes from the H level to the L level at the time t2, the transistor M1 is in the diode-connected configuration, and thus the gate-source voltage Vgs of the transistor M1 maintains CV while the voltage of the internal node NA is at the H level. At the time t2 during this, the set signal S changes to be at the L level. Thereafter, when the reset signal R changes from the L level to the H level at the time t4, the voltage of the internal node NA turns to be at the L level. At this time point, the set signal S is already at the L level, and thus the gate-source voltage Vgs of the transistor M1 maintains 0V after that, and the state in which the voltage stress is not applied to the transistor M1 continues.

In the unit circuit UC in the present embodiment (FIG. 9), as indicated by the voltage waveform of "M1" in FIG. 10, during the normal drive period, the suspension state signal VTP is at the L level and the drive state signal VTPB is at the H level, and thus the transistor M1 is in the diode-connected form. Thus, the gate-source voltage Vgs of the transistor M1 changes in a manner similar to the gate-source voltage Vgs of the transistor M1 in the second comparative example (see the voltage waveform "M_dio" in FIG. 10). Thus, in the present embodiment, the positive voltage bias is applied to the transistor M1 for a short time from the time t1, but the voltage stress is not applied to the transistor M1 for the other periods.

Note that, in the set circuit 201 in the present embodiment, as indicated by the voltage waveform "M1B" in FIG. 10, the positive voltage bias is applied to a gate-source voltage Vgs1 of the first auxiliary transistor M1B in a period before the time t1. When the set signal S rises from the L level to the H level at the time t1, the gate-source voltage Vgs1 of the first auxiliary transistor M1B decreases toward 0V according to the charging of the internal node NA, and maintains 0V while the set signal S is at the H level after when the gate-source voltage Vgs1 reaches 0V. Thereafter, when the set signal S changes from the H level to the L level at the time t2, the gate-source voltage Vgs1 of the first auxiliary transistor M1B turns to be a positive value. That is, the first auxiliary transistor M1B turns a state in which the positive voltage bias is applied. On the other hand, the suspension state signal VTP is maintained at the L level during the normal drive, and thus a gate-source voltage Vgs2 of the second auxiliary transistor M1C is maintained 0V (see the voltage waveform of "M1C" in FIG. 10).

FIG. 11 illustrates voltage application states in four operation periods 1 to 4 of the transistor included in each of the set circuit 201a in the first comparative example, the set circuit 201b in the second comparative example, and the set circuit 201 in the present embodiment. In FIG. 11, "L" and "H" attached to the terminals or the nodes of the transistors M1, M1B, and M1C in the set circuits 201a, 201b, and 201 indicate that the voltages of the terminals or the nodes are at the L level and the H level, respectively.

As can be seen from the above description with reference to FIG. 10, when the gate line GL(k) connected to the unit circuit UCx(k) is in the non-select state (the voltage of the internal node NA is at the L level) during the normal drive, the voltage application state in the transistor M1 of the VDD-connected configuration included in the unit circuit UCa(k) as the first comparative example, the voltage application state in the transistor M1 of the diode-connected configuration included in the unit circuit UCb(k) as the second comparative example, and the voltage application state in the transistors M1, M1B, and M1C included in the unit circuit UC(k) in the present embodiment are in states as illustrated in a circuit diagram of the transistor M1 of the VDD-connected configuration, a circuit diagram of the transistor M1 of the diode-connected configuration, and a circuit diagram of the transistors M1, M1B, and M1C of the first embodiment (the circuit diagram of the set circuit 201), respectively, in [operation period 1] in FIG. 11.

As can be seen from the voltage waveforms of "M1_ref", "M1_dio", and "M1" in the "normal drive" illustrated in FIG. 10, and the voltage application states in the transistor M1 of the VDD-connected configuration, the transistor M1 of the diode-connected configuration, and the transistors M1, M1B, and M1C of the first embodiment in the [operation period 1] illustrated in FIG. 11, in the unit circuit UCx(k) to which the gate line in the non-select state is connected during the normal drive, none of the transistor M1 of the VDD-connected configuration, the transistor M1 of the diode-connected configuration, nor the transistors M1, M1B, and M1C of the first embodiment is in the negative voltage bias state.

When the gate line GL(k) connected to the unit circuit UCx(k) is in the select state (the voltage of the internal node NA is at the H level) during the normal drive, the voltage application state in the transistor M1 of the VDD-connected configuration, the voltage application state in the transistor M1 of the diode-connected configuration, and the voltage application state in the transistors M1, M1B, and M1C in the first embodiment are in states as illustrated in a circuit diagram of the transistor M1 of the VDD-connected configuration, a circuit diagram of the transistor M1 of the diode-connected configuration, and a circuit diagram of the transistors M1, M1B, and M1C of the first embodiment (the circuit diagram of the set circuit 201), respectively, in [operation period 2] in FIG. 11.

As can be seen from the voltage waveform of "M1_ref" in the "normal drive" illustrated in FIG. 10 and the voltage application state in the transistor M1 of the VDD-connected configuration in the [operation period 2] illustrated in FIG. 11, in the unit circuit UCa(k) to which the gate line in the select state is connected during the normal drive, the transistor M1 is in the negative voltage bias state (in FIG. 11, thick solid arrows indicate the voltage bias). In the normal drive, an operation (scan of the gate lines GL) in which all the gate lines GL(1) to GL(n) are sequentially selected is repeated, and thus the transistor M1 repeatedly turns the negative voltage bias state in each of all the unit circuits UCa(1) to UCa(n), and the threshold value of the transistor M1 is shifted in the negative direction. Thus, when the normal drive continues for a long time, the transistor M1 may be in the depletion in a large number of unit circuits UCa. When the depletion of the transistor M1 occurs in the large number of unit circuits UCa, power consumption in the gate driver 200 serving as the GDM circuit significantly increases.

As can be seen from the voltage waveforms of "M1_dio" and "M1" in the "normal drive" illustrated in FIG. 10 and the voltage application states in the transistor M1 of the diode-connected configuration and the transistors M1, M1B, and M1C of the first embodiment in the [operation period 2] illustrated in FIG. 11, in the unit circuit UCx(k) to which the gate line in the select state is connected during the normal drive, none of the transistor M1 of the diode-connected configuration nor the transistors M1, M1B, and M1C of the first embodiment is in the negative voltage bias state.

1.5.3 Operation Before and After Suspension

The display device according to the present embodiment is provided with the in-cell touch panel (see FIG. 3), and a plurality of pause periods for the touch position detection are provided by performing the scan suspension in one frame period (see FIG. 4). Hereinafter, referring to FIG. 10 together with FIGS. 7, 8, and 9, the operation of the gate driver 200 before and after the scan suspension will be described in consideration of a case where each of the unit circuit UCa (FIG. 7) as the first comparative example, the unit circuit UCb (FIG. 8) as the second comparative example, and the unit circuit UC (FIG. 9) in the present embodiment is used. In the case of performing the scan suspension, generation of the gate clock signals CKA to CKD is controlled in the display control circuit 100 so that all the gate clock signals CKA to CKD stop and maintain the L level (non-active state) during a predetermined period including the pause period Tsens for the touch position detection (hereinafter, the predetermined period during which all the gate clock signals CKA to CKD stop is referred to as a "drive stop period TP"). As illustrated in FIG. 10, the drive state signal VTPB is at the H level except for the drive stop period TP, changes to be at the L level after the start of the drive stop period TP and before the start of the pause period Tsens, maintains the L level during the pause period Tsens, and changes to be at the H level after the end of the pause period Tsens and before the end of the drive stop period TP.

In the following description, similarly to the above description for the operation in the normal drive, focusing on the unit circuit UCx(k) of the k-th stage in the shift register constituting the gate driver 200, whether the unit circuit UCa as the first comparative example, the unit circuit UCb as the second comparative example, or the unit circuit UC in the present embodiment is used in the gate driver 200, the gate clock signal CKA is supplied as the input clock signal CK to the clock input terminal 21 of the unit circuit UCa(k), UCb(k), or UC(k) of the k-th stage (see FIG. 6). Note that here, as illustrated in FIG. 10, in the unit circuit UCx(k) of the k-th stage, for a case where the drive stop period TP starts after the set signal S is input and before the output signal Q changes from the L level to the H level, the operation of the gate driver 200 before and after the scan suspension will be described. For other cases, the description of the operation before and after the scan suspension will be omitted since the operation is clear from the following description and the above description of the operation during the normal drive.

In the example illustrated in FIG. 10, a period from time t13 to time t18 is the drive stop period TP, and a period from time t15 to time t16 is the pause period Tsens of the scan for the touch position detection. The drive state signal VTPB changes from the H level to the L level at the time t14, maintains the L level from the time t14 to the time t17, and changes to be at the H level at the time t17.

As illustrated in FIG. 10, the output signal Q of the unit circuit UCx(k−2) of two stages before as the set signal S supplied to the set input terminal 22 rises from the L level to the H level at time t1*l* before the drive stop period TP, maintains the H level, and then falls to be at the L level at time t12.

When the set signal S is at the H level (in the period from the time t1*l* to time t12), in any of the unit circuit UCa (FIG. 7) as the first comparative example, the unit circuit UCb (FIG. 8) as the second comparative example, and the unit circuit UC (FIG. 9) in the present embodiment, the internal node NA is charged to be at the H level, and thus, the transistor M10 of the output circuit 203 turns the on state. The gate clock signal CKA as the input clock signal supplied to the clock input terminal 21 is supplied to the drain terminal of the transistor M10. However, as described above, the generation of the gate clock signals CKA to CKD is controlled so that all the gate clock signals CKA to CKD stop in the drive stop period TP (from the time t13 to time t18), and thus the input clock signal CKA is at the L level in a period from the time t1*l* to time t18. Thus, the output signal Q is maintained at the L level until the time t18.

In the stabilizing circuit 204, when the set signal S turns to be at the H level at the time t1*l*, the transistor M6+ turns the on state, and when the voltage of the internal node NA turns to be at the H level as described above, the transistor M6 also turns the on state. As a result, the voltage of the stabilizing node NB changes from the H level to the L level and the transistor M8 turns the off state.

After the set signal S changes to be at the L level, the drive state signal VTPB changes from the H level to the L level at the time t14. As a result, an L-level voltage as the drive state signal VTPB is supplied to the stabilizing node NB via the transistor M5. With the drive state signal VTPB at the H level, a current flows from the second control input terminal 27 to the reference power source line VSS via the transistors M5 and M6 when the voltage of the stabilizing node NB is at the L level, but the current is suppressed by the drive state signal VTPB turning to be at the L level at the time t14.

Thereafter, the suspension state signal VTP changes from the L level to the H level at the time t15, and the pause period Tsens for the touch position detection starts. In this pause period Tsens (from the time t15 to time t16), the transistor M5 is in the on state and the drive state signal VTPB is at the L level, and thus the stabilizing node NB is maintained at the L level and the suspension state signal VTP is at the H level, allowing the voltage of the internal node NA to be stably maintained at the H level and the transistor M21 to be in the on state. While the stabilizing node NB is maintained at the L level, the transistor M8 is in the off state (other transistors M1, M2, and M9 connected to the internal node NA are also in the off state), and the voltage of the internal node NA having turned to be at the H level at the time t1*l* maintains the H level also in the pause period Tsens. Note that, while the stabilizing node NB is maintained at the L level, the transistor M14 is also in the off state.

When the suspension state signal VTP changes to be at the L level at the time t16, the transistor M21 turns the off state, but all the clock signals CKA to CKD including the input clock signal CKA are in the stop state and are at the L level, and thus the voltage of the gate line GL(k) connected to the output terminal 29 is maintained at the L level.

Thereafter, when the drive state signal VTPB changes to be at the H level at the time t17, a current flows from the second control input terminal 27 to the reference power source line VSS via the transistors M5 and M6, but the voltage of the stabilizing node NB is maintained at the L level and the voltage of the internal node NA is maintained at the H level.

Thereafter, at the time t18, the drive stop period TP ends, and the input clock signal CKA rises from the L level to the H level. Thus, the voltage of the internal node NA is pushed up via the capacitor C1 to be a voltage higher than the H level. As a result, the transistor M10 completely turns the on state, and the input clock signal CKA at the H level is output as the output signal Q via the transistor M10. The output signal Q is applied as the scanning signal G(k) to the gate line GL(k).

Thereafter, at time t19, the input clock signal CKA changes from the H level to the L level, so that the scanning signal G(k) applied from the output terminal 29 to the gate line GL(k) changes from the H level to the L level. The potential of the internal node NA decreases in response to the change of the input clock signal CKA from the H level to the L level.

Thereafter, at time t20, the output signal Q of the unit circuit UCx(k+3) of the (k+3)-th stage as the reset signal R supplied to the reset input terminal 23 of the unit circuit UCx(k) changes from the L level to the H level. As a result, the transistor M9 of the reset circuit 202 turns the on state and the suspension state signal VTP at the L level is supplied to the internal node NA, and thus the voltage of the internal node NA is discharged to be at the L level.

In the stabilizing circuit 204, when the voltage of the internal node NA changes from the H level to the L level at the time t20, the transistor M6 turns the off state. The set signal S has changed from the H level to the L level at the time t12, and thus the transistor M6+ is already in the off state. Thus, the drive state signal VTPB at the H level is supplied to the stabilizing node NB via the transistor M5, and turns a state of holding the voltage at the H level. This turns the transistors M8 and M14 the on state. As a result, the voltage of the internal node NA is stably maintained at the L level, and the voltage of the gate line GL(k) connected to the output terminal 29 is also stably maintained at the L level.

With the operation of the unit circuit UCx(k) as described above, the driving of the gate line GL is stopped during the drive stop period TP (from the time t13 to time t18), in the drive stop period TP, the drive state signal VTPB turning to be at the L level allows the voltage of the stabilizing node NB to be stably maintained at the L level, and the suspension state signal VTP turning to be at the H level allows the voltage of the internal node NA to be stably maintained at the H level as well as the voltage of the gate line GL(k) connected to the output terminal 29 to be stably maintained at the L level.

Each of the other unit circuits UCx(i) (i≠k, 1≤i≤n) in the gate driver 200 also operates in the similar manner according to the signals S, R, CK, VTP, and VTPB each input to a corresponding one of the clock input terminal 21, the set input terminal 22, the reset input terminal 23, the first control input terminal 26, and the second control input terminal 27. As a result, in the gate driver 200, the pulses supplied by the first and second gate start pulse signals GSP1 and GSP2 are sequentially transferred by the shift register constituting the gate driver 200, so that the gate lines GL(1) to GL(n) in the display portion 400 are sequentially selected for each predetermined period, and thus a scan of gate lines GL is performed. The drive stop period TP is provided in the middle of the scan and the levels of the suspension state signal VTP and the drive state signal VTPB are controlled, so that the pause period Tsens for the touch detection is provided in the drive stop period TP.

Note that, in the unit circuit UCx(i) in which the gate line GL(i) in the non-select state is connected to the output terminal 29, the voltage of the internal node NA is maintained at the L level and the voltage of the stabilizing node NB is maintained at the H level. Note that, when the drive state signal VTPB is at the L level in the drive stop period TP, the voltage at the L level is supplied from the second control input terminal 27 to the stabilizing node NB via the transistor M5, and thus the transistor M8 turns the off state. However, in the pause period Tsens, the gate clock signals CKA to CKD are stopped and the suspension state signal VTP is at the H level, so that the transistor M21 is in the on state, and thus the voltage of the gate line GL(i) connected to the output terminal 29 is stably maintained at the L level.

1.5.4 Voltage Stress on Transistor in Set Circuit Before and After Suspension

In the unit circuit UCx(k) included in the gate driver 200 that operates as described above before and after the scan suspension, the voltage stress applied to the setting transistor M1, that is, the gate-source voltage Vgs in the setting transistor M1 will be described below.

As illustrated in FIG. 10, in any of the unit circuit UCa(k) as the first comparative example, the unit circuit UCb(k) as the second comparative example, and the unit circuit UC(k) in the present embodiment, in a period before the time t1*l*, the set signal S and the reset signal R are both at the L level and the voltage of the internal node NA is also at the L level, and thus the gate-source voltage Vgs of the transistor M1 is 0V.

In the unit circuit UCa (FIG. 7) as the first comparative example, as indicated by the voltage waveform "M1_ref" in the "before and after the suspension" in FIG. 10, the gate-source voltage Vgs of the transistor M1 changes during a period from the time t1*l* to time t12 in a manner similar to the change of the gate-source voltage Vgs of the transistor M1 in the normal drive during a period from the time t1 to time t2, and the gate-source voltage Vgs of the transistor M1 turns to be the negative value due to the change of the set signal S from the H level to the L level at the time t12. That is, the transistor M1 turns the negative voltage bias state. This negative voltage bias state continues until the reset signal R changes from the L level to the H level at the time t20 after the drive stop period TP. When the reset signal R changes from the L level to the H level, the voltage of the internal node NA turns to be at the L level, and thereafter, the gate-source voltage Vgs of the transistor M1 is 0V, and thus the transistor M1 turns a state in which the voltage stress is not applied to the transistor M1.

In the unit circuit UCb (FIG. 8) as the second comparative example, as indicated by the voltage waveform "M1_dio" in the "before and after the suspension" in FIG. 10, the gate-source voltage Vgs of the transistor M1 changes during a period from the time t1/ to time t12 in a manner similar to the change of the gate-source voltage Vgs of the transistor M1 in the normal drive during a period from the time t1 to time t2, and is 0V at the time t12. Although the set signal S changes from the H level to the L level at the time t12, the transistor M1 is in the diode-connected configuration, and thus the gate-source voltage Vgs of the transistor M1 maintains 0V while the voltage of the internal node NA is at the H level. At the time t20 after the drive stop period TP, the reset signal R changes from the L level to the H level, and thus the voltage of the internal node NA turns to be at the L level. The set signal S maintains the L level at and after the time t12, and thus the gate-source voltage Vgs of the transistor M1 maintains 0V even after the time t20 and the state in which the voltage stress is not applied to the transistor M1 continues.

In the unit circuit UC (FIG. 9) in the present embodiment, the suspension state signal VTP is at the L level and the drive state signal VTPB is at the H level until the time t14, and thus the transistor M1 is in the diode-connected form. Thus, as indicated by the voltage waveform "M1" in the "before and after the suspension" in FIG. 10, the gate-source voltage Vgs of the transistor M1 changes in a manner similar to the gate-source voltage Vgs of the transistor M1 in the second comparative example, until the time t14. The drive state signal VTPB changes to be at the L level at the time t14, and during a period from the time t14 to time t15, the suspension state signal VTP and the drive state signal VTPB are both at the L level, the transistors M1B and M1C are in the off state, and the gate-source voltage Vgs of the transistor M1 is maintained 0V. Thereafter, the suspension state signal VTP changes to be at the H level at the time t15, and thus the suspension state signal VTP at the H level is supplied to the drain terminal of the transistor M1 via the transistor M1C. As a result, the gate-source voltage Vgs of the transistor M1 turns to be the negative value. That is, the transistor M1 turns the negative voltage bias state. This negative voltage bias state continues during the pause period Tsens. Although the suspension state signal VTP changes to be at the L level at the time t16, the transistor M1C is in the diode-connected form, and thus this negative voltage bias state continues even after the time t16. Thereafter, at the time t17, the drive state signal VTPB changes to be at the H level, and the transistor M1B turns the on state. As a result, the gate-source voltage Vgs of the transistor M1 changes to be 0V, and thereafter maintains 0V.

Note that, in the set circuit 201 in the present embodiment, the suspension state signal VTP is at the L level and the drive state signal VTPB is at the H level until the time t14, and thus the gate-source voltage Vgs1 of the first auxiliary transistor M1B changes until the time t14 in a manner similar to the change of the gate-source voltage Vgs of the transistor M1B in the normal drive until the time t3. In the operations before and after the suspension, the drive state signal VTPB changes to be at the L level at the time t14 and is maintained at the L level during a period from the time t14 to time t17. As a result, the gate-source voltage Vgs1 of the transistor M1B turns to be 0V at the time t14. In the pause period (from the time t15 to time t16) Tsens, the suspension state signal VTP is at the H level, and the voltage at the H level is supplied to the drain terminal of the transistor M1 via the transistor M1C. However, the set signal S supplied to the drain terminal of the transistor M1B is maintained at the L level at and after the time t12, and thus the gate-source voltage Vgs1 of the transistor M1B is maintained CV until the time t17 after the pause period Tsens. At the time t17, the drive state signal VTPB changes to be at the H level, and thus the gate-source voltage Vgs1 of the transistor M1B turns to be the positive value. In this way, the transistor M1B is in a state (positive voltage bias state) in which the positive voltage bias is applied at and after the time t17.

On the other hand, the second auxiliary transistor M1C is in the diode-connected form, and the gate-source voltage Vgs2 of the second auxiliary transistor M1C is 0V since the suspension state signal VTP is at the L level except for the pause period (from the time t15 to time t16) Tsens. At the start time point t15 of the pause period Tsens, the suspension state signal VTP changes to be at the H level, and thus the gate-source voltage Vgs2 of the transistor M1C turns to be the positive value. However, a node to which the source terminal of the transistor M1C is connected is charged by the suspension state signal VTP at the H level, and thus the gate-source voltage Vgs2 of the transistor M1C decreases toward 0V, and is maintained 0V after reaching CV.

As can be seen from the above description with reference to FIG. 10, when the gate line GL(k) connected to the unit circuit UCx(k) is in the non-select state (the voltage of the internal node NA is at the L level) in the pause period Tsens, the voltage application state in the transistor M1 of the VDD-connected configuration included in the unit circuit UCa(k) as the first comparative example, the voltage application state in the transistor M1 of the diode-connected configuration included in the unit circuit UCb(k) as the second comparative example, and the voltage application state in the transistors M1, M1B, and M1C included in the unit circuit UC(k) in the present embodiment are in states as illustrated in a circuit diagram of the transistor M1 of the VDD-connected configuration, a circuit diagram of the transistor M1 of the diode-connected configuration, and a circuit diagram of the transistors M1, M1B, and M1C of the first embodiment (the circuit diagram of the set circuit 201), respectively, in [operation period 3] in FIG. 11.

As can be seen from the voltage waveforms of "M1_ref", "M1_dio", and "M1" in the "before and after the suspension" illustrated in FIG. 10 and the voltage application states in the transistor M1 of the VDD-connected configuration, the transistor M1 of the diode-connected configuration, and the transistors M1, M1B, and M1C of the first embodiment in the [operation period 3] illustrated in FIG. 11, in the unit circuit UCx(k) to which the gate line in the non-select state is connected in the pause period Tsens, none of the transistor M1 of the VDD-connected configuration, the transistor M1 of the diode-connected configuration, nor the transistors M1, M1B, and M1C of the first embodiment is in the negative voltage bias state. Note that in FIG. 11, dashed-dotted arrows and dotted arrows each indicate a leakage current generated in a transistor in the off state.

When the gate line GL(k) connected to the unit circuit UCx(k) is in the select state (the voltage of the internal node NA is at the H level) in the pause period Tsens, the voltage application state in the transistor M1 of the VDD-connected configuration, the voltage application state in the transistor M1 of the diode-connected configuration, and the voltage application state in the transistors M1, M1B, and M1C in the first embodiment are in states as illustrated in a circuit diagram of the transistor M1 of the VDD-connected configuration, a circuit diagram of the transistor M1 of the diode-connected configuration, and a circuit diagram of the transistors M1, M1B, and M1C of the first embodiment (the circuit diagram of the set circuit 201), respectively, in [operation period 4] in FIG. 11.

As can be seen from the voltage waveform of the "M1_ref" in the "before and after the suspension" illustrated in FIG. 10 and the voltage application state in the transistor M1 of the VDD-connected configuration in the [operation period 4] illustrated in FIG. 11, in the unit circuit UCa(k) to which the gate line in the select state is connected in the pause period Tsens, the transistor M1 is in the negative voltage bias state.

As can be seen from the voltage waveform of the "M1_dio" in the "before and after the suspension" illustrated in FIG. 10 and the voltage application state in the transistor M1 of the diode-connected configuration in the [operation period 4] illustrated in FIG. 11, in the unit circuit UCb(k) to which the gate line in the select state is connected in the pause period Tsens, the transistor M1 of the diode-connected configuration is not in the negative voltage bias state. However, in the pause period Tsens, a leakage current is generated in the transistor M1 of the diode-connected configuration, and the voltage of the internal node NA decreases.

As can be seen from the voltage waveform of the "M1" in the "before and after the suspension" illustrated in FIG. 10 and the voltage application state in the transistor M1 of the first embodiment in the [operation period 4] illustrated in FIG. 11, in the unit circuit UC(k) to which the gate line in the select state is connected in the pause period Tsens, the transistor M1 is in the negative voltage bias state. This may shift the threshold value of the transistor M1. As described above, in the present embodiment, in the unit circuit UC(k) in which the internal node NA is at the H level during the scan suspension, that is, of the n-stage shift register constituting the gate driver 200, the unit circuit UC(k) of a stage (hereinafter referred to as a "suspension stage") connected to the gate line to be in the select state during the scan suspension, the transistor M1 of the set circuit 201 is in the negative voltage bias state in the pause period Tsens.

Note that, in the set circuit 201 of each unit circuit UC(k) in the first embodiment, a leakage current is generated in the first auxiliary transistor M1B in the pause period Tsens (see the set circuit 201 including the transistors M1, M1B, and M1C in the first embodiment in the [operation period 4] illustrated in FIG. 11). However, a leakage current is hardly generated in the setting transistor M1 in the unit circuit UC(k) of the suspension stage in the pause period Tsens, and thus the pause period Tsens having the sufficient length for the touch position detection can be provided.

1.6 Effect of First Embodiment

As described above, according to the present embodiment, in each unit circuit UC of the gate driver 200 provided in the active matrix display device provided with the in-cell touch panel, the setting transistor M1 receiving the set signal S is in a diode-connected configuration during the normal drive, based on the suspension state signal VTP and the drive state signal VTPB as the control signals for the scan suspension, and is in a configuration corresponding to the VDD-connected configuration in the pause period Tsens provided by the scan suspension for the touch position detection (see the set circuit 201 in the unit circuit UC illustrated in FIG. 9, the voltage waveforms of "VTP" and "VTPB" illustrated in FIG. 10, and the set circuit 201 of the first embodiment illustrated in FIG. 11). As a result, during the normal drive, the setting transistor M1 in the set circuit 201 does not turn the negative voltage bias state, and thus is not in the depletion due to the threshold shift (see the voltage waveform of the "M1" in the "normal drive" illustrated in FIG. 10, and the set circuit 201 of the first embodiment in the [operation period 1] and the [operation period 2] illustrated in FIG. 11).

On the other hand, in the pause period Tsens for the touch position detection, in the unit circuit UC(k) in which the internal node NA is at the H level, that is in the unit circuit UC(k) of the suspension stage, the setting transistor M1 in the set circuit 201 is in the negative voltage bias state (see the voltage waveform of the "M1" in the "before and after the suspension" illustrated in FIG. 10), and thus the transistor M1 may be in the depletion due to the threshold shift. However, the unit circuit including the transistor M1 that turns the negative voltage bias state is only the unit circuit UC(k) of the suspension stage (see the set circuit 201 in the first embodiment in the [operation period 1] to the [operation period 4] illustrated in FIG. 11), and is only about 1% to 2% of all the unit circuits UC(1) to UC(n). Thus, in the gate driver 200 in the present embodiment, even if the transistor M1 in the unit circuit UC(k) of the suspension stage is in the depletion, unlike the case of using the unit circuit UCa in FIG. 7 (see the transistor M1 of the VDD-connected configuration in the [operation period 2] illustrated in FIG. 11) as the first comparative example in which the transistor M1 may be in the depletion in the normal drive, the increase in the current consumption does not become a problem.

In the unit circuit UC(k) in the present embodiment, unlike the unit circuit UCb of FIG. 8 (see the transistor M1 of the diode-connected configuration in the [operation period 4] illustrated in FIG. 11) as the second comparative example in which the leakage current is generated in the transistor M1 of the diode-connected configuration in the pause period Tsens, the leakage current is hardly generated in the transistor M1 in the unit circuit UC(k) of the suspension stage in the pause period Tsens (see the set circuit 201 in the first embodiment in the [operation period 4] illustrated in FIG. 11). Thus, the pause period Tsens having the sufficient length for the touch position detection can be provided.

Thus, according to the present embodiment as described above, in the display device provided with the in-cell touch panel, the pause period Tsens having the sufficient length for the touch position detection can be provided by the scan suspension while suppressing the increase in the current consumption due to the depletion of the transistor M1 in the unit circuit UC in the gate driver 200.

2. Second Embodiment

Next, a display device according to a second embodiment will be described. The display device according to the present embodiment is also the active matrix liquid crystal display device provided with the in-cell touch panel, and the overall configuration is as illustrated in FIG. 1, similarly to the first embodiment, and the same or corresponding parts as or to those in the first embodiment are denoted by the same reference numerals. Also in the present embodiment, the gate driver 200 is the monolithic driver (GDM circuit), and the display device according to the present embodiment has the same configuration as that of the display device according to the first embodiment except for the unit circuit UC in the gate driver 200 (see FIGS. 1 to 5C). The unit circuit UC constituting the gate driver in the present embodiment will be described below and detailed description of other parts will be omitted.

2.1 Configuration of Unit Circuit

Figure 12:
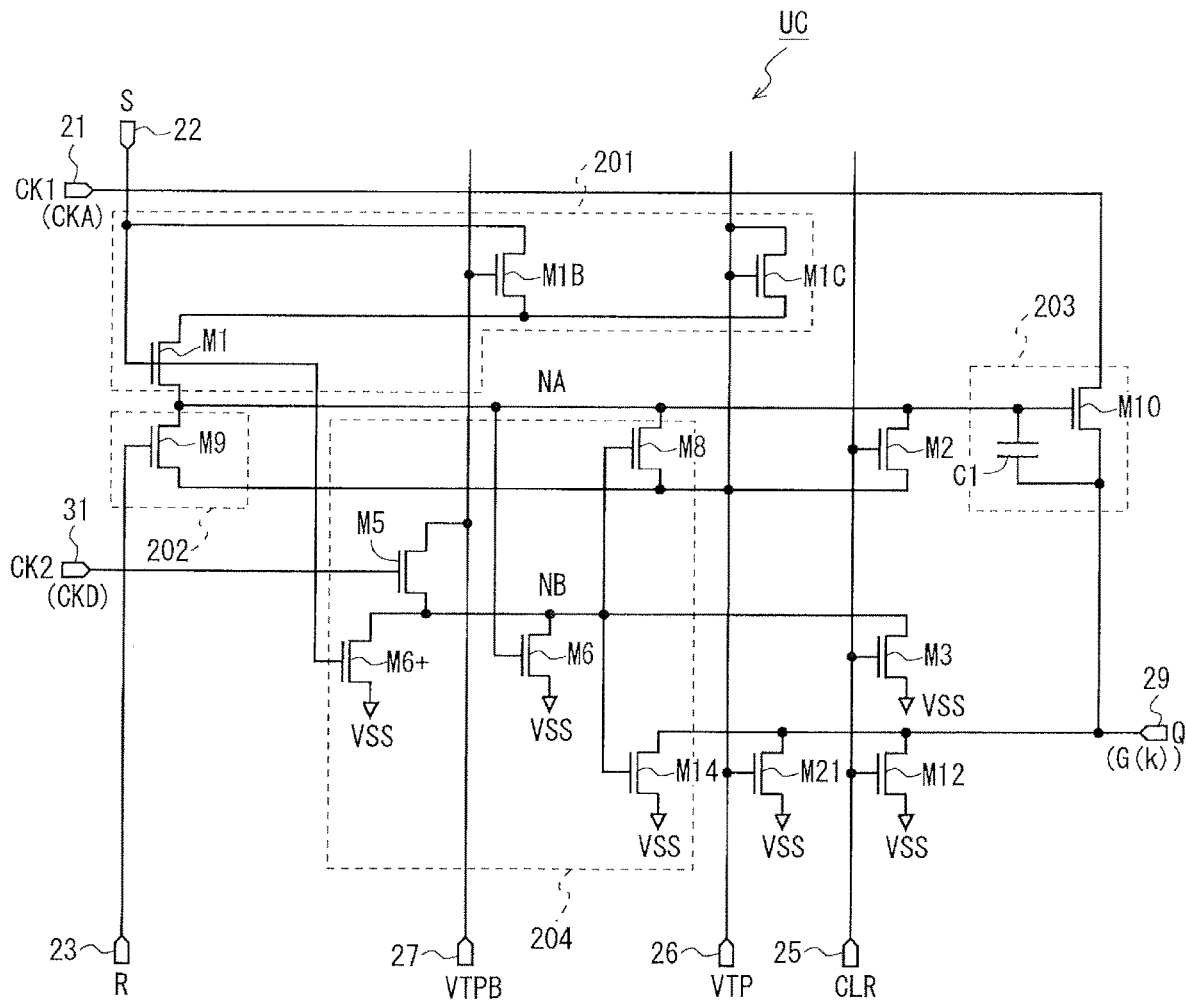
FIG. 12 is a circuit diagram illustrating a configuration of a unit circuit constituting a gate driver in a second embodiment.

FIG. 12 is a circuit diagram illustrating a configuration of the unit circuit UC in the present embodiment. Similarly to the unit circuit UC (FIG. 9) in the first embodiment, the unit circuit UC includes twelve transistors M1 to M3, M5, M6, M6+, M8 to M10, M12, M14, and M21, and one capacitor C1, and includes the input terminals 21 to 23, 25 to 27 and the output terminal 29. However, unlike the unit circuit UC (FIG. 9) in the first embodiment, the unit circuit US (FIG. 12) in the present embodiment includes an input terminal 31 as a new clock input terminal instead of the power source terminal 24 for receiving the high-level power supply voltage VDD.

As illustrated in FIG. 12, the input terminal 21 is a first clock input terminal for receiving the first input clock signal CK1, the input terminal 31 is a second clock input terminal for receiving a second input clock signal CK2, the input terminal 22 is a set input terminal for receiving the set signal S, the input terminal 23 is a reset input terminal for receiving the reset signal R, the input terminal 25 is a clear input terminal for receiving the clear signal CLR, the input terminal 26 is a first control input terminal for receiving the suspension state signal VTP as the suspension control signal, the second control input terminal 27 is a second control input terminal for receiving the drive state signal VTPB as the suspension control signal, and the output terminal 29 is a terminal for outputting as the scanning signal G(k) the output signal Q of the unit circuit UC. Note that, also in the present embodiment, in the gate driver 200, the reference power source line VSS for supplying the low-level power supply voltage VSS serving as the reference voltage to all the unit circuits UCs is arranged, and as illustrated in FIG. 12, some transistors included in each unit circuit UC are connected to the reference power source line VSS.

The internal configuration of the unit circuit UC in the present embodiment is the same as that of the unit circuit (FIG. 9) in the first embodiment except that the gate terminal of the transistor M5 is connected to the input terminal 31 as the clock input terminal instead of the power source terminal 24. Similarly to the unit circuit UC (FIG. 9) in the first embodiment, the transistors M1 to M3, M5, M6, M6+, M8 to M10, M12, M14, and M21 included in the unit circuits UC (FIG. 12) in the present embodiment are also the N-channel type and enhancement type oxide TFTs.

In the unit circuit UC(k) in the present embodiment, one of the gate clock signals CKA to CKD included in the scanning side control signal GCTL supplied from the display control circuit 100 to the gate driver 200 is supplied as the first input clock signal CK1 to the first clock input terminal 21. The first input clock signal CK1 corresponds to the input clock signal CK of the unit circuit UC(i) (i=1 to n) illustrated in FIG. 6, and the first input clock signal CK1 is output as the output signal Q when the internal node NA is at the H level. The output signal Q of the unit circuit UC(k+3) of three stages after the unit circuit UC(k) is supplied as the reset signal R to the reset input terminal 23. Of the gate clock signals CKA to CKD, a gate clock signal that is the first input clock signal CK1 of a stage (unit circuit UC(k+3) three stages after) that outputs the reset signal R as the output signal Q is input as the second input clock signal CK2 to the second clock input terminal 31. Note that, the present disclosure is not limited thereto, and another clock signal may be used as the second input clock signal CK2 depending on the situation.

For example, when the gate clock signals CKA to CKD have the waveforms as illustrated in FIG. 10 in the normal drive and the gate clock signal CKA is supplied as the first input clock signal CK1 to the first clock input terminal 21 of a certain unit circuit UC(k), the gate clock signal CKD is supplied as the second input clock signal CK2 to the second clock input terminal 31 of the unit circuit UC(k). When such a second input clock signal CK2 is supplied to the second clock input terminal 31, the transistor M5 is in the off state at the time point of rising of the set signal S. Thus, the set signal S rises from the L level to the H level, so that the voltage of the internal node NA turns to be at the H level as well as the voltage of the stabilizing node NB turns to be at the L level, and the transistor M8 turns to be at an off level. Note that, unlike the unit circuit UC (FIG. 9) in the first embodiment, the transistor M5 is in the off state at this time, and thus no current flows from the second control input terminal 27 to the reference power source line VSS via the transistors M5 and M6+.

2.2 Operation of Gate Driver

Next, the operation of the gate driver 200 in the present embodiment, that is, the operation of the gate driver 200 using the unit circuit UC configured as illustrated in FIG. 12 will be described. Here, focusing on the unit circuit UC(k) of the k-th stage in the shift register constituting the gate driver 200, FIG. 12 illustrates the unit circuit UC(k) of the k-th stage in the present embodiment. In the unit circuit UC(k) of the k-th stage, the gate clock signal CKA is supplied as the first input clock signal CK1 to the first clock input terminal 21, and the gate clock signal CKD is supplied as the second input clock signal CK2 to the second clock input terminal 31.

In a period of the normal drive, similarly to the unit circuit UC(k) in the first embodiment, the unit circuit UC(k) in the present embodiment operates as indicated by waveforms such as the "NA", "NB", "Q", and "M1" in the "normal drive" illustrated in FIG. 10, based on the gate clock signals CKA to CKD illustrated in FIG. 10, the suspension state signal VTP and the drive state signal VTPB as the suspension control signals, the set signal S, the reset signal R, and the like. In a period of the before and after the suspension, the unit circuit UC(k) in the present embodiment operates as indicated by the waveforms such as the "NA", "NB", "Q", and "M1" in the "before and after the suspension" illustrated in FIG. 10, based on the gate clock signals CKA to CKD, the suspension state signal VTP and the drive state signal VTPB as the suspension control signals, the set signal S, the reset signal R, and the like illustrated in FIG. 10.

Based on the operation of the unit circuit UC(k) as described above, the gate driver 200 in the present embodiment operates in a manner similar to the gate driver 200 in the first embodiment in both the period of the normal drive and the period of the before and after the suspension.

2.3 Effect in Second Embodiment

As described above, also in the gate driver 200 in the present embodiment, during the period of the normal drive, the transistor M1 in the set circuit 201 in the unit circuit UC does not turn the negative voltage bias state, and thus is not in the depletion due to the threshold shift. In the gate driver 200, even if the transistor M1 in the unit circuit UC(k) of the suspension stage is in the depletion, the ratio of the unit circuit UC(k) of the suspension stage is extremely small, and thus the increase in the current consumption does not become a problem. Further, in the unit circuit UC(k), the leakage current is hardly generated in the transistor M1 in the unit circuit UC(k) of the suspension stage in the pause period Tsens, and thus the pause period Tsens having the sufficient length for the touch position detection can be provided. Thus, according to the present embodiment, similarly to the first embodiment, in the display device provided with the in-cell touch panel, the pause period Tsens having the sufficient length for the touch position detection can be provided by the scan suspension while suppressing the increase in the current consumption due to the depletion of the transistor M1 in the unit circuit UC in the gate driver 200.

In the present embodiment, as can be seen from FIG. 12, unlike the unit circuit UC (FIG. 9) in the first embodiment, supply of the high-level power supply voltage VDD to the unit circuit UC is no longer required. Thus, the number of power source lines for the high-level power supply voltage VDD can be reduced in the shift register constituting the gate driver 200.

3. Modified Examples

The disclosure is not limited to the above-described embodiment described above, and various modifications may be made without departing from the scope of the disclosure.

In the embodiment described above, the four-phase clock signals CKA to CKD are used as the gate clock signals, the gate driver 200 is configured as illustrated in FIG. 6, and the unit circuit UC in the gate driver 200 is configured as illustrated in FIG. 9. However, the present disclosure is not limited to this, and the gate driver 200 may have a configuration different from the configurations illustrated in FIGS. 6 and 9 and operate based on the gate clock signals of the number of phases other than four phases.

Although the liquid crystal display device has been described as an example in the embodiments above, the disclosure is not limited thereto, and the disclosure is applicable to other types of the display devices such as an organic Electroluminescence (EL) display device as long as the display devices are the active matrix display device provided with the touch panel and configured to perform the scan suspension for the touch position detection. In a case where the display device according to the embodiments is the active matrix organic EL display device, the pixel forming section 4 illustrated in FIG. 2 includes an organic EL element (also referred to as an organic light-emitting diode (OLED)), a holding capacitor, a TFT serving as the drive transistor, a TFT serving as the writing control switching element, and the like, in place of the TFT 40 serving as the pixel switching element, the liquid crystal capacitance 42, and the like. In this case, the voltage of the data line DL(j), that is, the voltage of the data signal D(j), is written and held in the holding capacitor via the writing control switching element that is turned on/off by the gate line GL(i), and the drive transistor supplies the current corresponding to the voltage held by the holding capacitor to the organic EL element. As a result, the organic EL element emits light with brightness corresponding to the voltage written in the holding capacitor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A scanning signal line drive circuit configured to drive a plurality of scanning signal lines arranged in a display portion of a display device provided with a touch panel, the scanning signal line drive circuit comprising:
   a plurality of unit circuits cascade-connected to each other and configured to operate as a shift register based on a multi-phase clock signal,
   wherein the multi-phase clock signal includes a plurality of clock signals, each of the plurality of clock signals cyclically corresponding to a respective one of the plurality of unit circuits,
   a clock operation of the plurality of clock signals stops during a pause period provided in a frame period, the pause period being used to detect a touch position on the touch panel,
   each of the plurality of unit circuits corresponds to a respective one of the plurality of scanning signal lines,
   each unit circuit of the plurality of unit circuits is a bistable circuit configured to determine a state of the unit circuit, based on a set signal and a reset signal each supplied as an input signal, and includes
   an internal node configured to selectively hold a voltage of a first or second logic level indicating a state of the unit circuit,
   a set input terminal configured to receive the set signal,
   a set circuit configured to supply the voltage of the first logic level to the internal node when the set signal is active, and
   an output circuit configured to output a scanning signal configured to cause a corresponding one of the plurality of scanning signal lines to be in a select state in response to a corresponding clock signal when the voltage of the first logic level is held in the internal node, and output a scanning signal configured to cause the corresponding one of the plurality of scanning signal lines to be in a non-select state in response to the corresponding clock signal when the voltage of the second logic level is held in the internal node, and
   the set circuit
   includes a setting transistor including a drain terminal, a source terminal connected to the internal node, and a gate terminal connected to the set input terminal, and
   is configured such that the voltage of the first logic level is supplied to the drain terminal of the setting transistor during the pause period, and the drain terminal of the setting transistor is connected to the gate terminal of the setting transistor during a period other than the pause period.

2. The scanning signal line drive circuit according to claim 1,
   wherein each of the plurality of unit circuits further includes
   a first control input terminal configured to receive a suspension state signal being active during the pause period and non-active during a period other than the pause period, and
   a second control input terminal configured to receive a drive state signal being active during a normal drive period and being non-active during a period other than the normal drive period, the normal drive period being a period in which the plurality of scanning signals are driven other than the pause period, and
   the set circuit further includes a first auxiliary transistor including a drain terminal connected to the set input terminal, a source terminal connected to the drain terminal of the setting transistor, and a gate terminal connected to the second control input terminal, and a second auxiliary transistor including a drain terminal connected to the first control input terminal, a source terminal connected to the drain terminal of the setting transistor, and a gate terminal connected to the first control input terminal.

3. The scanning signal line drive circuit according to claim 2, wherein each of the plurality of unit circuits further includes a reset input terminal configured to receive the reset signal, and a reset circuit configured to supply the voltage of the second logic level to the internal node when the reset signal is active, the reset circuit includes a resetting transistor including a drain terminal connected to the internal node, a source terminal connected to the first control input terminal, and a gate terminal connected to the reset input terminal, and the suspension state signal is a signal having the voltage of the first logic level when being active and having the voltage of the second logic level when being non-active.

4. The scanning signal line drive circuit according to claim 3, wherein each of the plurality of unit circuits further includes a stabilizing circuit including a stabilizing node that is a node different from the internal node and selectively holds the voltage of the first or second logic level, and the stabilizing circuit includes a first transistor configured to supply the voltage of the first logic level to the stabilizing node when the voltage of the second logic level is held in the internal node, a second transistor configured to supply the voltage of the second logic level to the stabilizing node when the voltage of the first logic level is held in the internal node, and a third transistor configured to supply the voltage of the second logic level to the internal node when the voltage of the first logic level is held in the stabilizing node.

5. The scanning signal line drive circuit according to claim 4, wherein the first transistor includes a drain terminal connected to the second control input terminal, a source terminal connected to the stabilizing node, and a gate terminal supplied with a power supply voltage corresponding to an on-voltage of the first transistor, the second transistor includes a drain terminal connected to the stabilizing node, a source terminal supplied with a reference voltage corresponding to the voltage of the second logic level, and a gate terminal connected to the internal node the third transistor includes a drain terminal connected to the internal node, a source terminal connected to the first control input terminal, and a gate terminal connected to the stabilizing node, and the drive state signal is a signal having the voltage of the first logic level when being active and having the voltage of the second logic level when being non-active.

6. The scanning signal line drive circuit according to claim 4, wherein each of the plurality of clock signals is a signal configured to alternately repeat a level corresponding to an active state and a level corresponding to a non-active state during a clock operation, the first transistor includes a drain terminal connected to the second control input terminal, a source terminal connected to the stabilizing node, and a gate terminal supplied with any one of the plurality of clock signals, the second transistor includes a drain terminal connected to the stabilizing node, a source terminal supplied with a reference voltage corresponding to the voltage of the second logic level, and a gate terminal connected to the internal node, and the third transistor includes a drain terminal connected to the internal node, a source terminal connected to the first control input terminal, and a gate terminal connected to the stabilizing node.

7. The scanning signal line drive circuit according to claim 4, wherein the stabilizing circuit further includes a fourth transistor configured to supply the voltage of the second logic level to the stabilizing node when the set signal is active.

8. The scanning signal line drive circuit according to claim 1, wherein the transistor included in each of the plurality of unit circuits is a thin film transistor including a channel layer formed of an oxide semiconductor.

9. A display device comprising:
the scanning signal line drive circuit according to claim 1.

10. The display device according to claim 9,
wherein the scanning signal line drive circuit and the display portion are integrally formed on an identical substrate.

* * * * *